(12) United States Patent
Barnes et al.

(10) Patent No.: US 8,403,569 B2
(45) Date of Patent: Mar. 26, 2013

(54) TERMINATION SYSTEM FOR FIBER OPTIC CONNECTION

(75) Inventors: Brandon A. Barnes, Fort Worth, TX (US); Kevin C. Beach, Haltom City, TX (US); Greg James Scherer, Keller, TX (US); Scott E. Semmler, Roanoke, TX (US)

(73) Assignee: Corning Cable Systems LLC, Hickory, NC (US)

( * ) Notice: Subject to any disclaimer, the term of this patent is extended or adjusted under 35 U.S.C. 154(b) by 429 days.

(21) Appl. No.: 12/689,745

(22) Filed: Jan. 19, 2010

(65) Prior Publication Data

US 2010/0183265 A1  Jul. 22, 2010

Related U.S. Application Data

(60) Provisional application No. 61/145,681, filed on Jan. 19, 2009.

(51) Int. Cl.
*G02B 6/36* (2006.01)
*G02B 6/00* (2006.01)

(52) U.S. Cl. ............. 385/77; 385/76; 385/137; 385/139
(58) Field of Classification Search ............. 385/76, 385/77, 134–137, 139
See application file for complete search history.

(56) References Cited

U.S. PATENT DOCUMENTS

| | | | |
|---|---|---|---|
| 4,182,017 A * | 1/1980 | Ford et al. | 29/428 |
| 4,953,940 A * | 9/1990 | Lanzetta et al. | 385/77 |
| 5,024,363 A * | 6/1991 | Suda et al. | 225/96.5 |
| 5,367,594 A | 11/1994 | Essert et al. | 385/70 |
| 6,079,297 A | 6/2000 | Chandler et al. | 81/9.51 |
| 6,099,392 A * | 8/2000 | Wiegand et al. | 451/41 |
| 7,280,733 B2 * | 10/2007 | Larson et al. | 385/139 |
| 7,346,256 B2 * | 3/2008 | Marrs et al. | 385/137 |
| 7,347,627 B2 | 3/2008 | Saito et al. | 385/60 |
| 7,369,738 B2 | 5/2008 | Larson et al. | 385/134 |
| 7,452,138 B2 | 11/2008 | Saito et al. | 385/86 |
| 7,556,438 B2 | 7/2009 | Oike et al. | 385/78 |
| 7,628,549 B2 * | 12/2009 | Takahashi et al. | 385/98 |
| 7,637,673 B2 | 12/2009 | Oike et al. | 385/98 |
| 2003/0066547 A1 | 4/2003 | Burke et al. | 134/21 |
| 2003/0123836 A1 | 7/2003 | Fujisawa et al. | 385/137 |
| 2004/0057675 A1 | 3/2004 | Doss et al. | 385/81 |
| 2009/0148109 A1 | 6/2009 | Takahashi et al. | 385/98 |

FOREIGN PATENT DOCUMENTS

| | | |
|---|---|---|
| EP | 1413903 B1 | 6/2002 |
| JP | 2005-265973 | 9/2005 |
| JP | 2005-265974 | 9/2005 |
| JP | 2005-265975 | 9/2005 |
| JP | 2005-283954 | 10/2005 |
| JP | 2006-030663 | 2/2006 |
| JP | 2006-030669 | 2/2006 |
| JP | 2007-065248 | 3/2007 |
| JP | 2007-240855 | 9/2007 |
| JP | 2007-240943 | 9/2007 |
| JP | 2008-089703 | 4/2008 |
| WO | WO2004/008205 A1 | 1/2004 |
| WO | WO2005/096050 A2 | 10/2005 |
| WO | WO2006/019161 A1 | 2/2006 |

* cited by examiner

*Primary Examiner* — Daniel Petkovsek
(74) *Attorney, Agent, or Firm* — Michael E. Carroll, Jr.

(57) ABSTRACT

Termination systems and devices disclosed herein use a handler that attaches to the optical fiber or cable and cooperates with other components for preparing the optical fiber and/or making the optical connection, thereby providing a simple, reliable, and easy termination for the optical fiber. For instance, the handler may cooperate with one or more of the following a strip tool, strip/clean tool, cleave tool for preparing the end of the optical fiber(s), and/or a connector-to-handler adapter for making the optical connection.

9 Claims, 52 Drawing Sheets

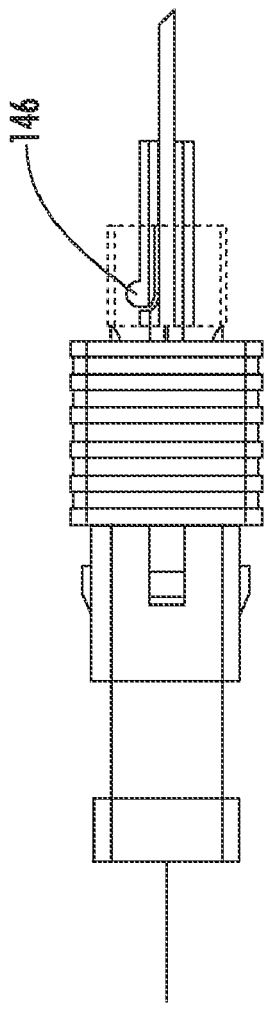
FIG. 4A
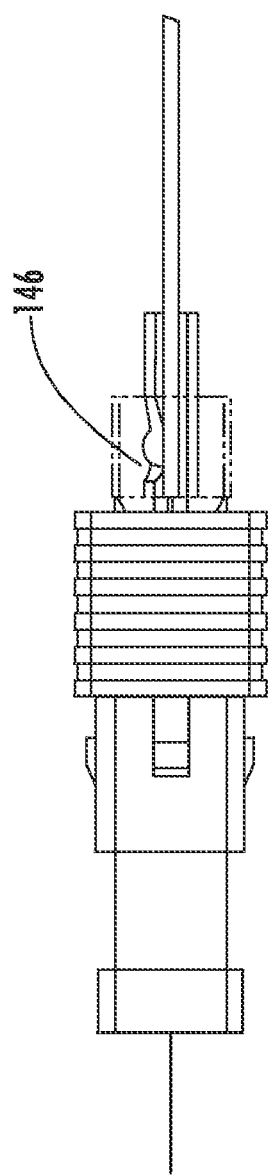
FIG. 4b
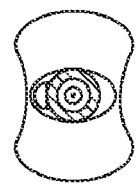
OPEN
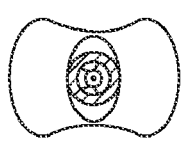
CLOSED

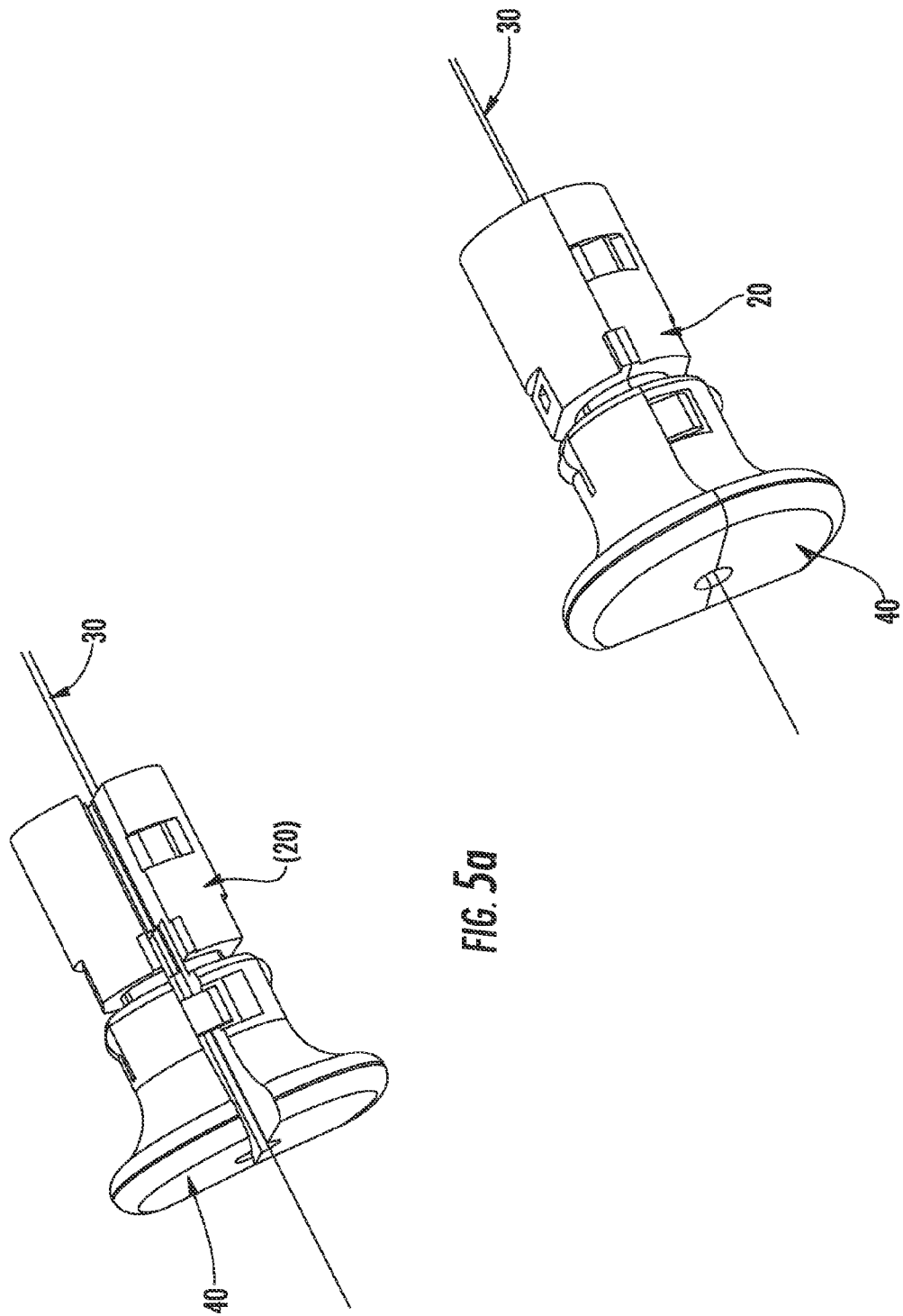

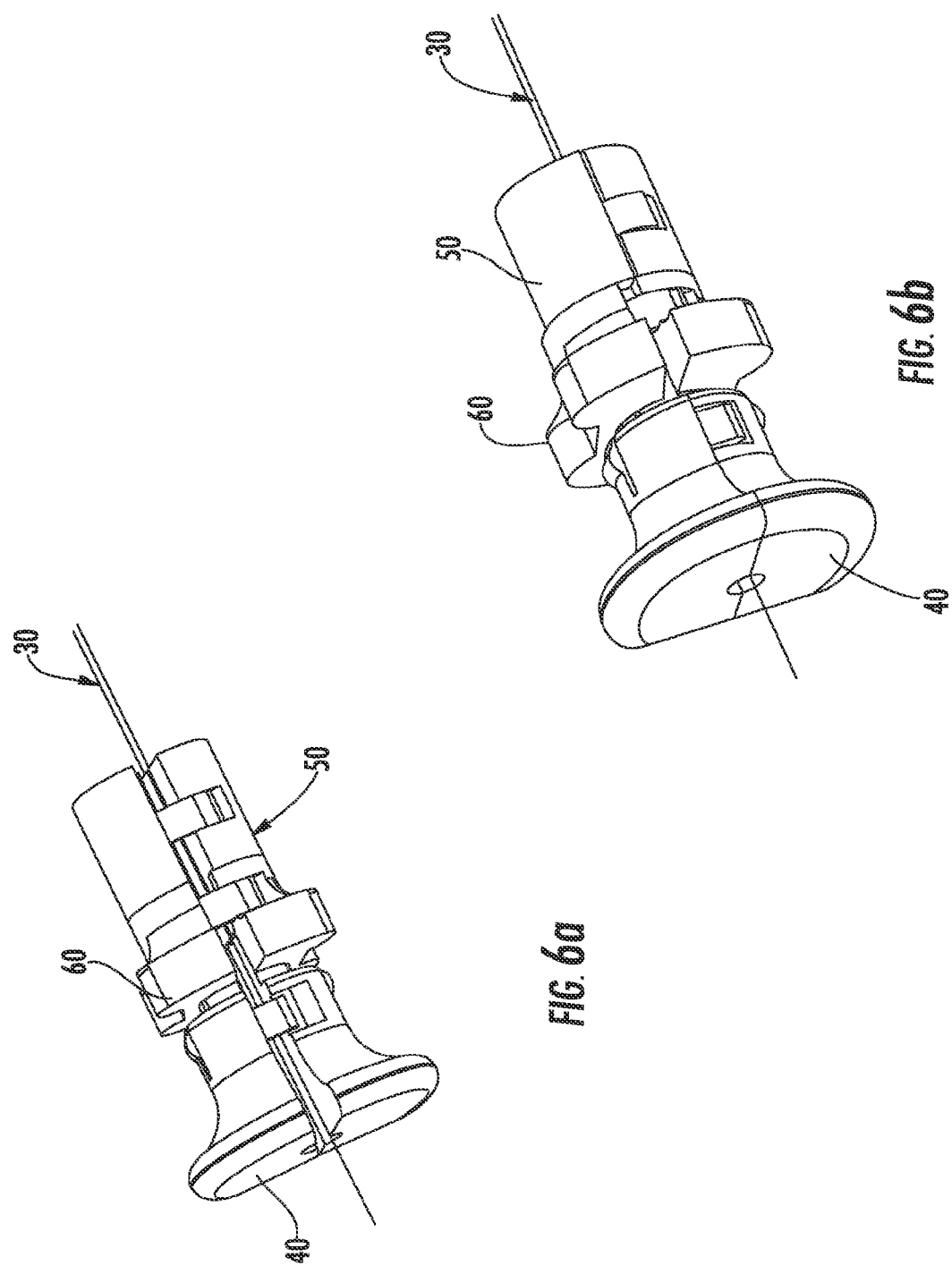

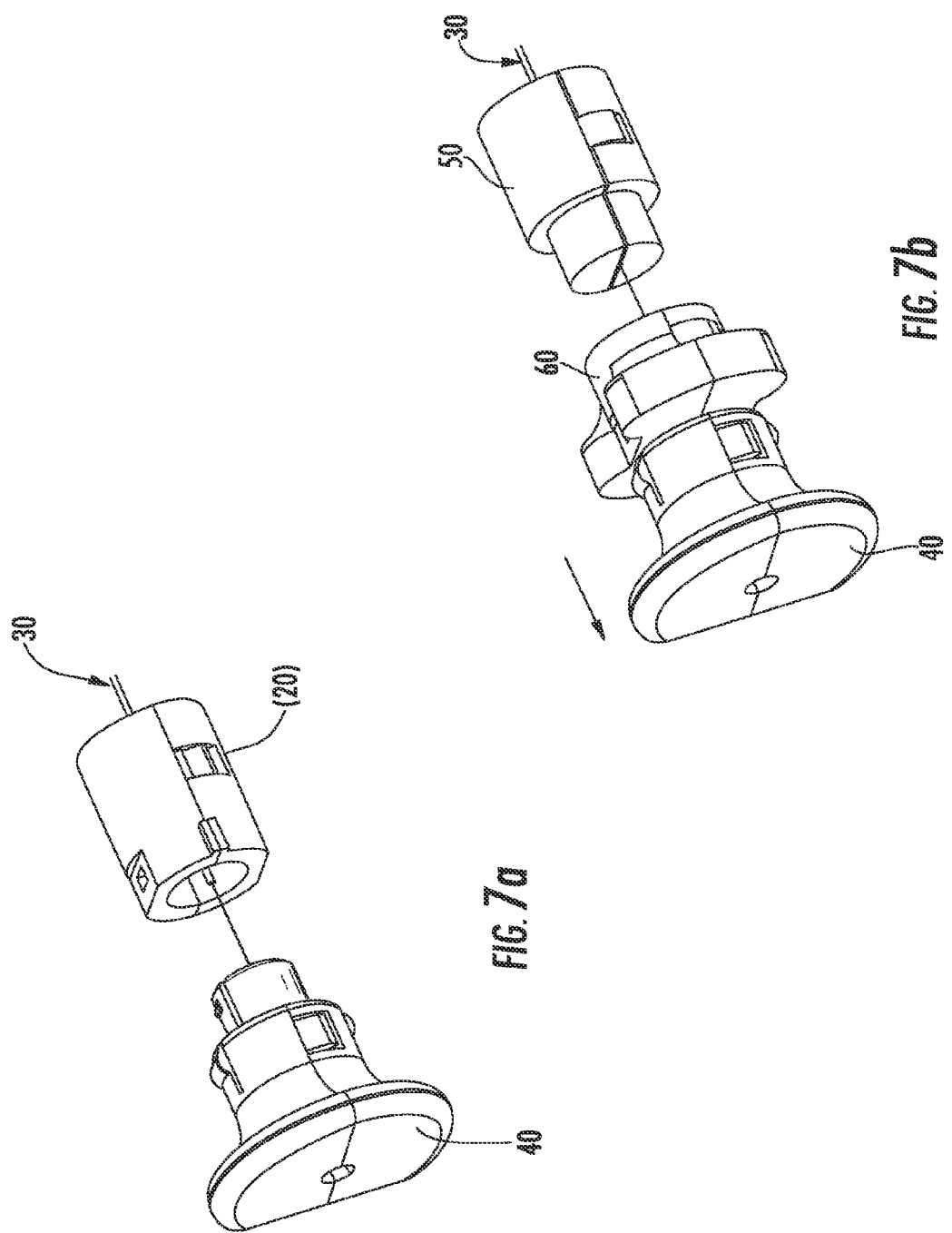

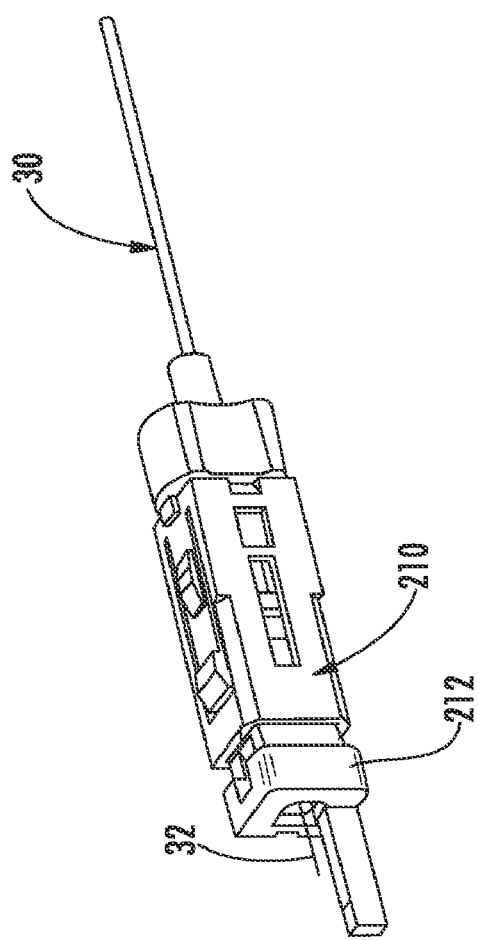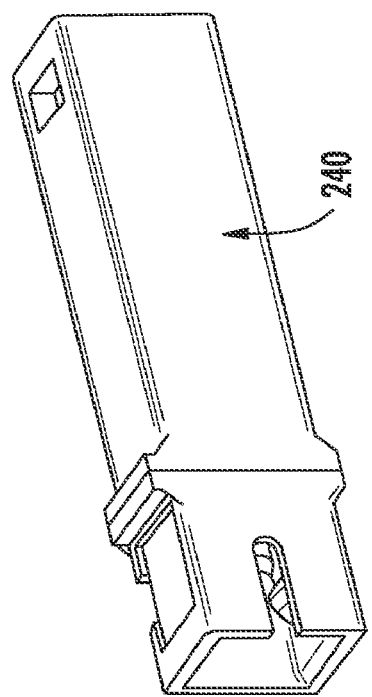
FIG. 26

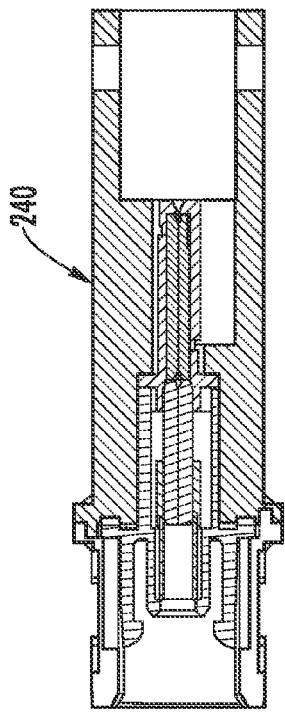
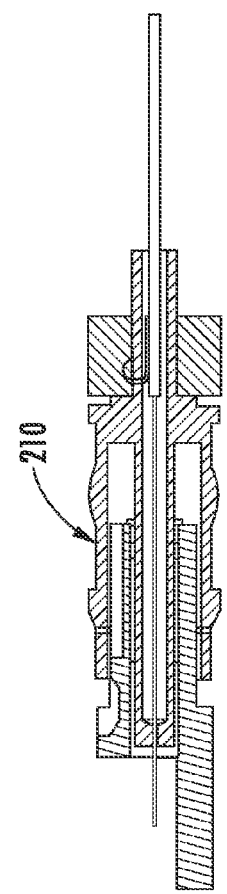
FIG. 27

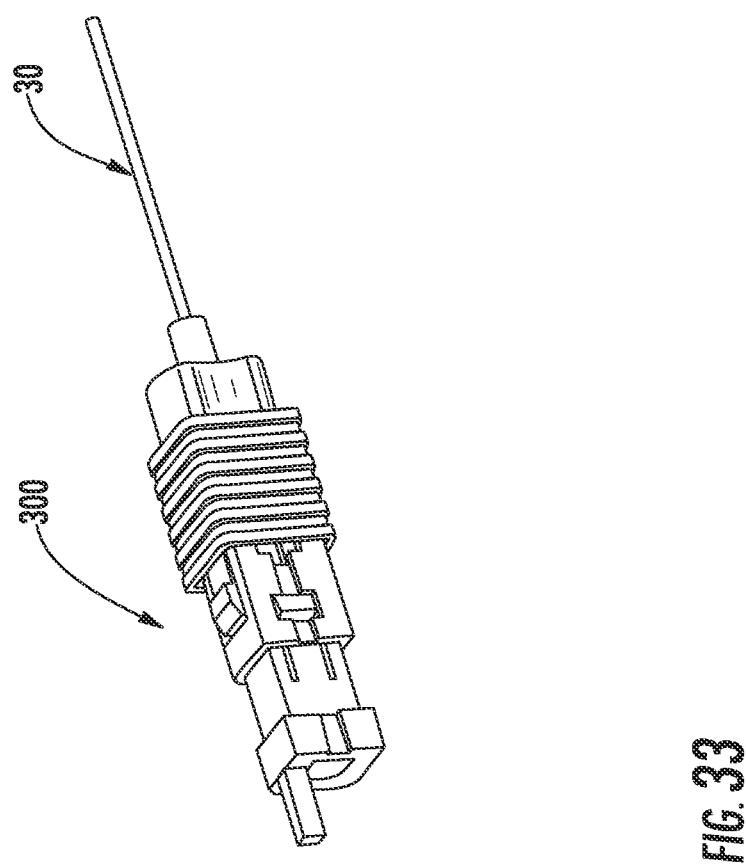
FIG. 33
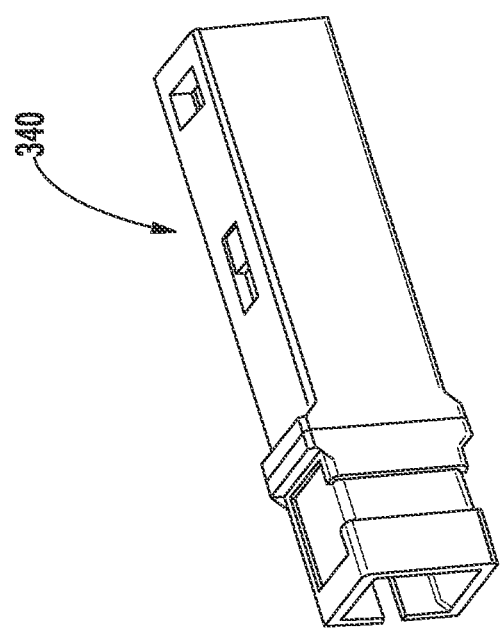

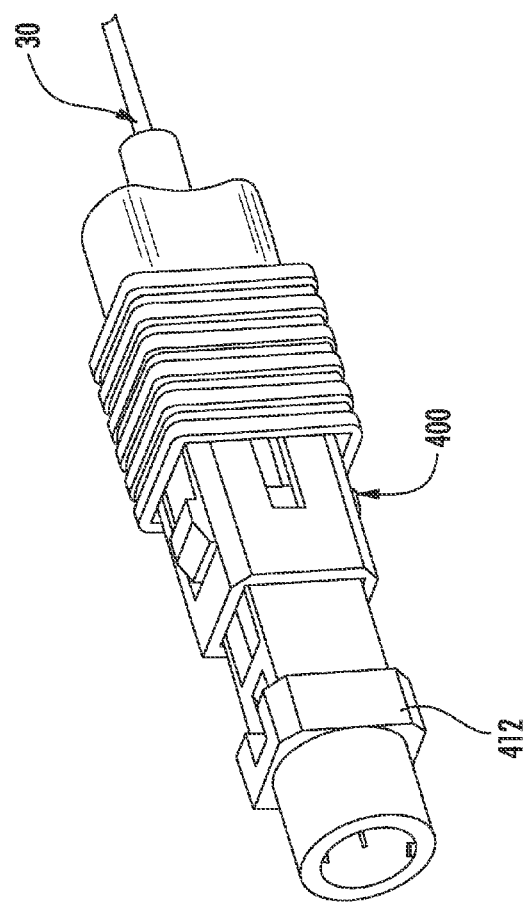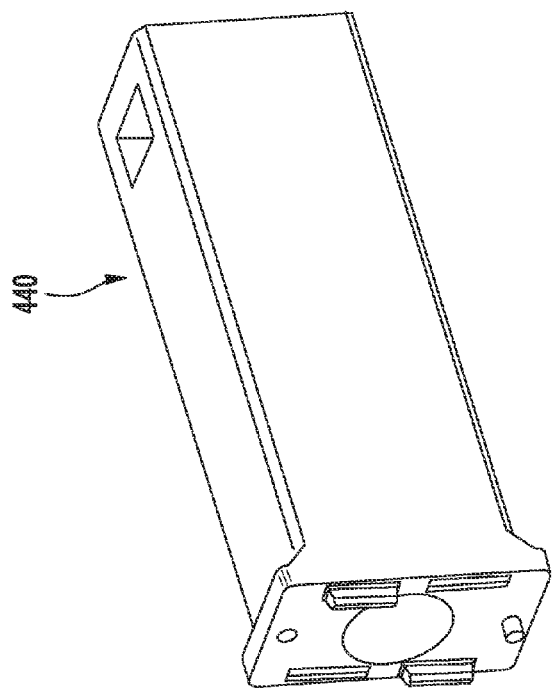
FIG. 38

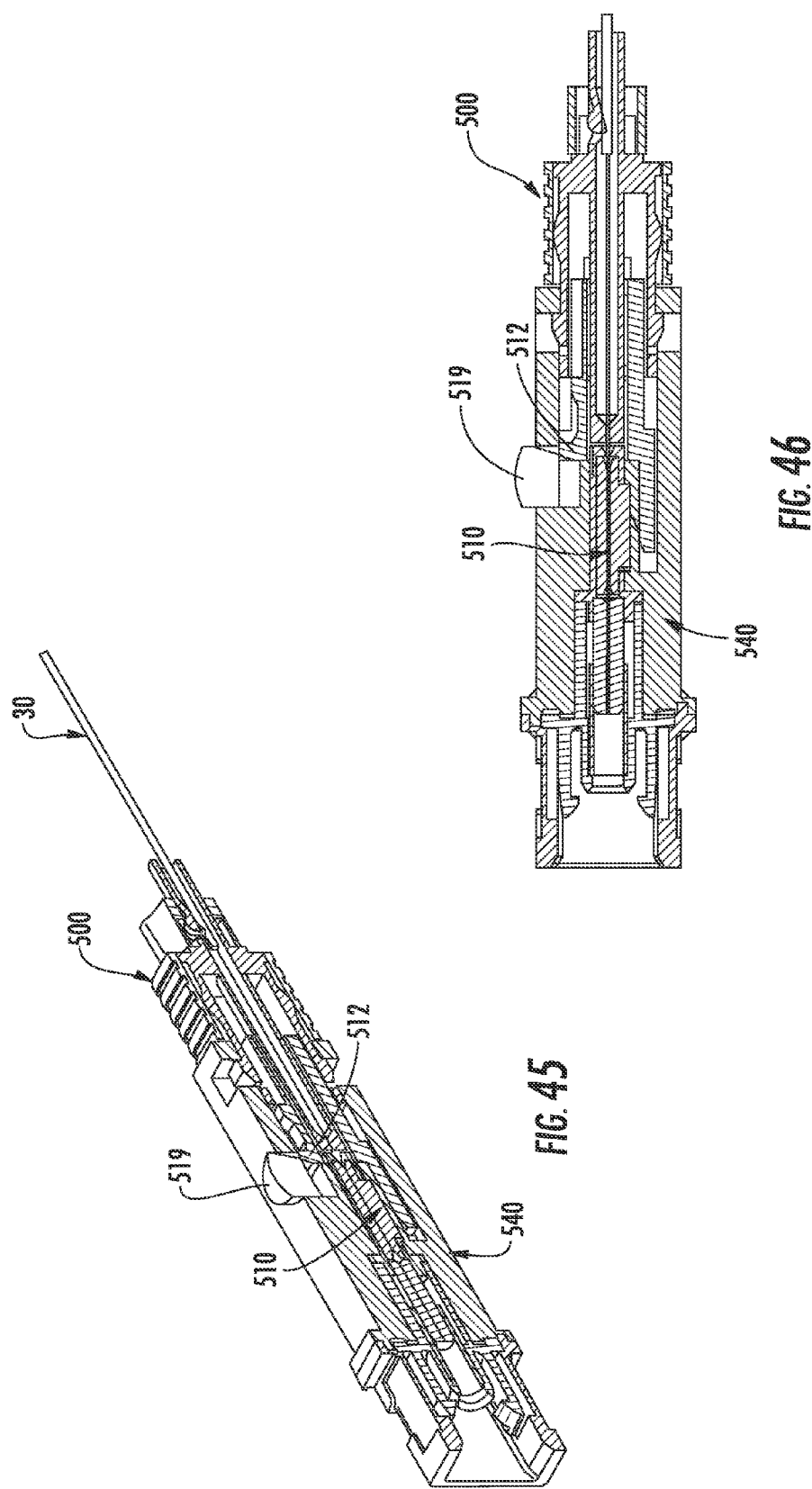

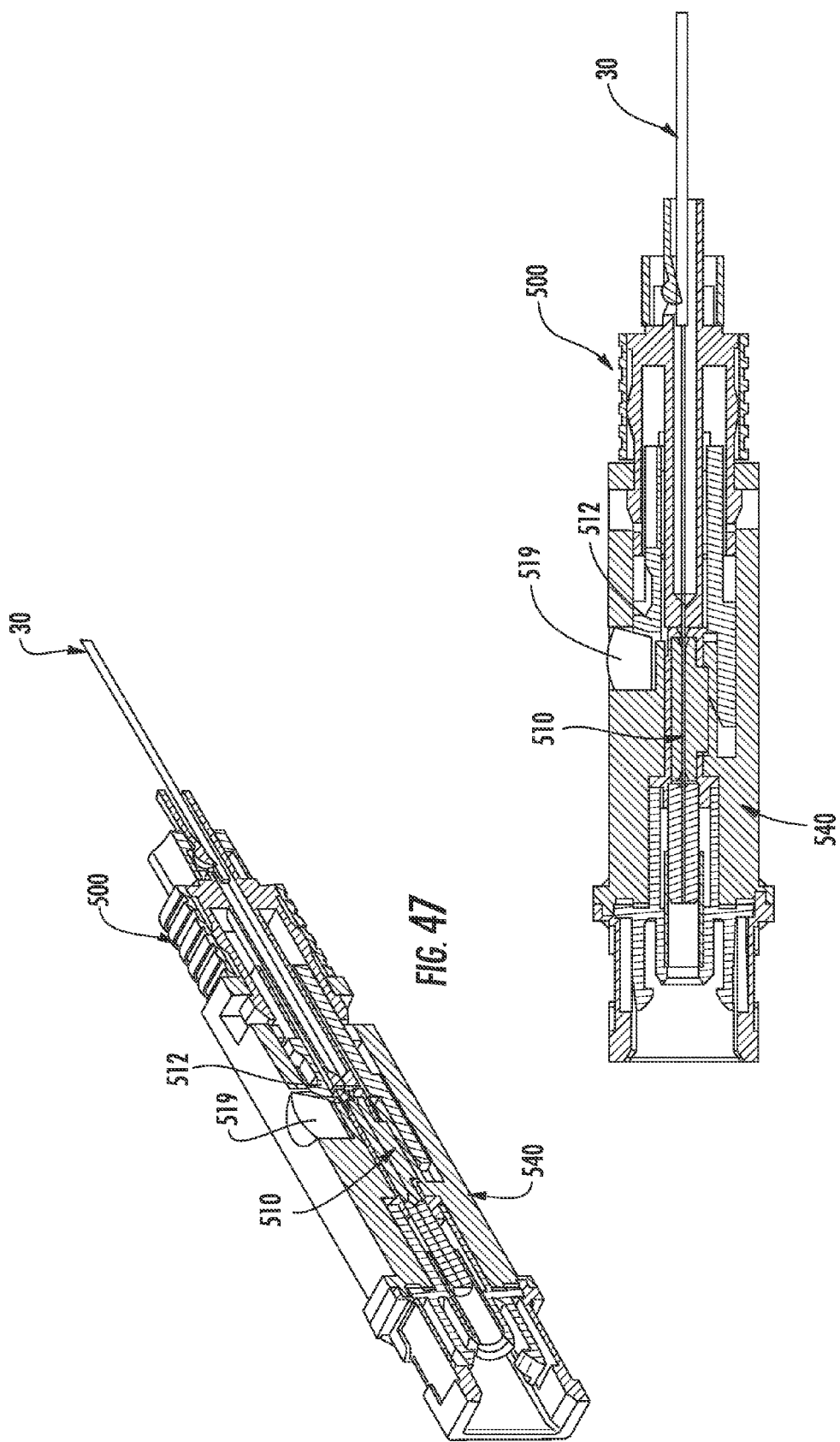

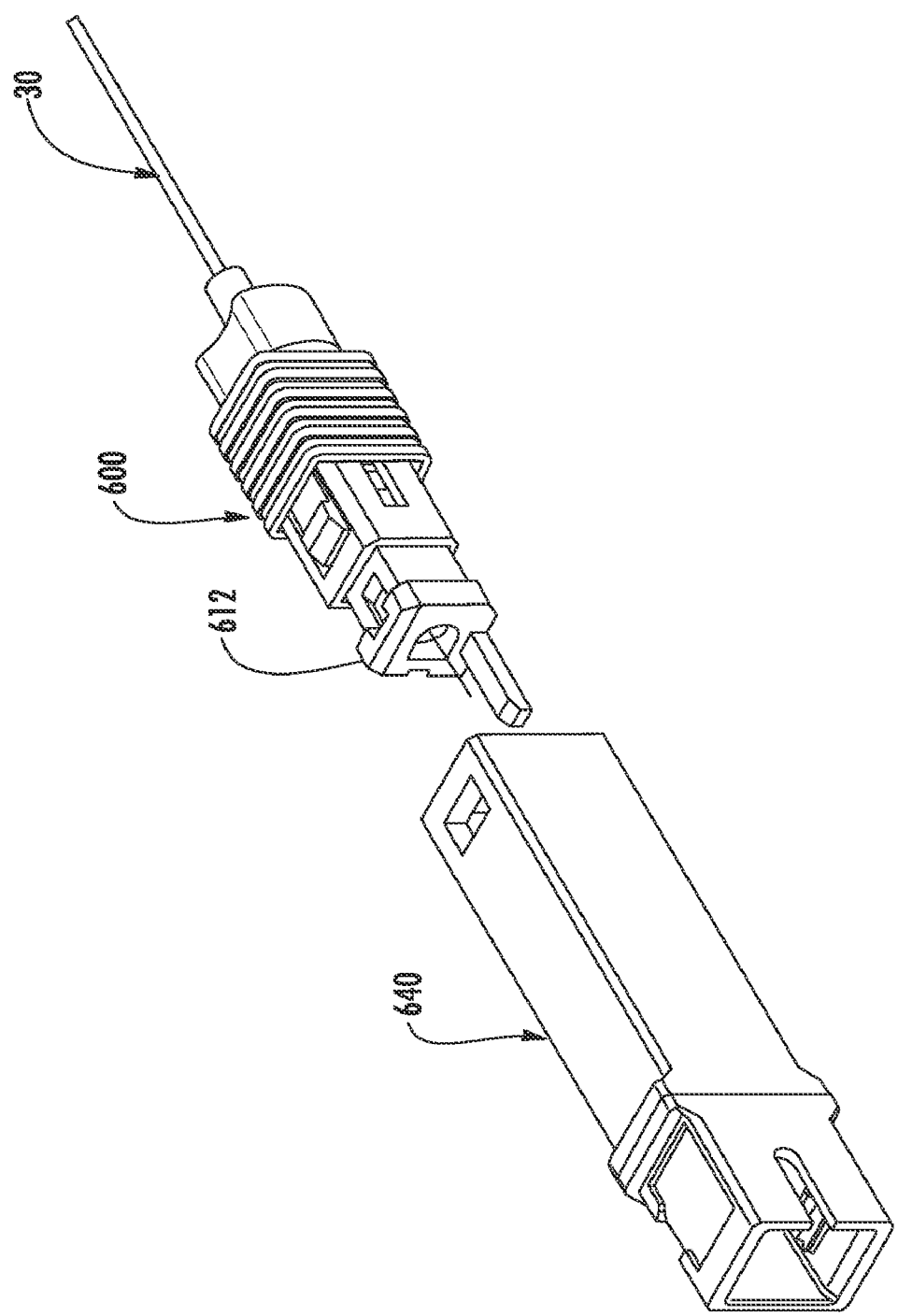

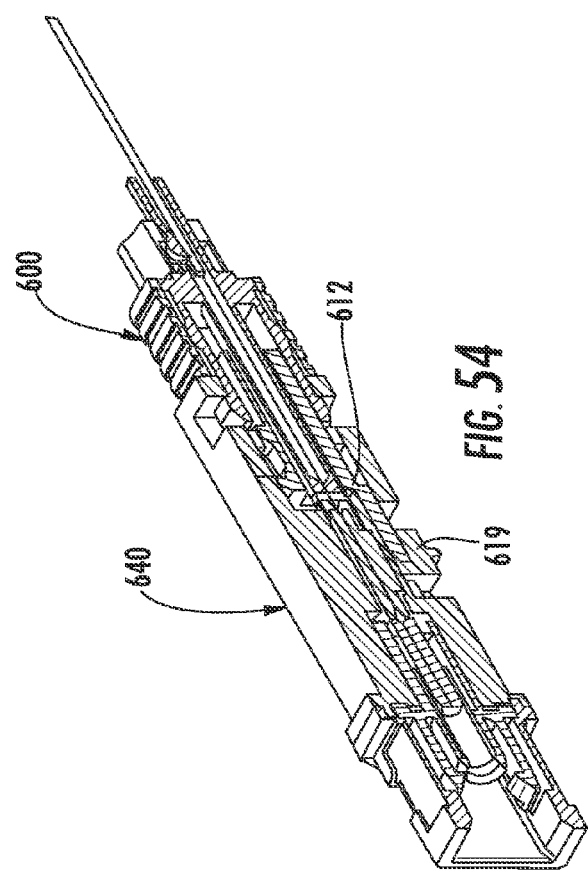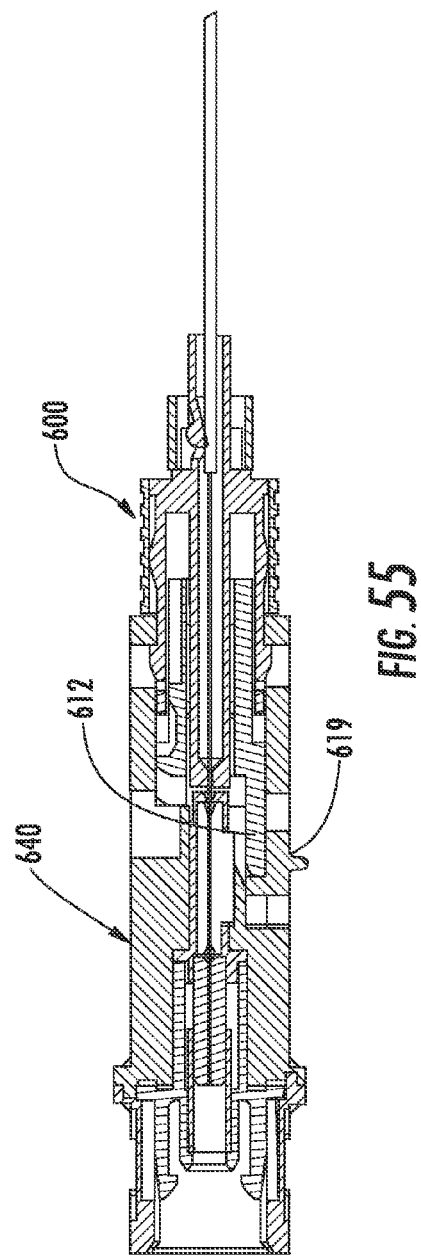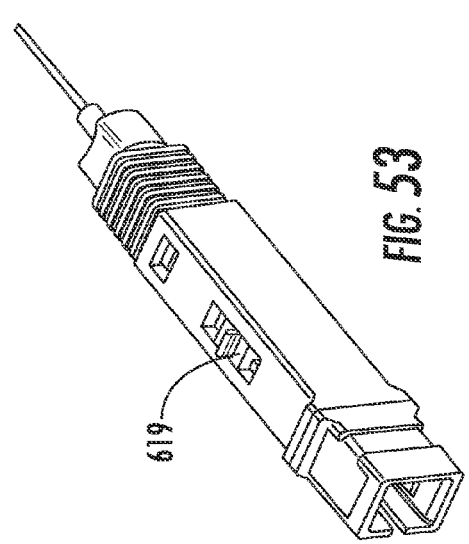

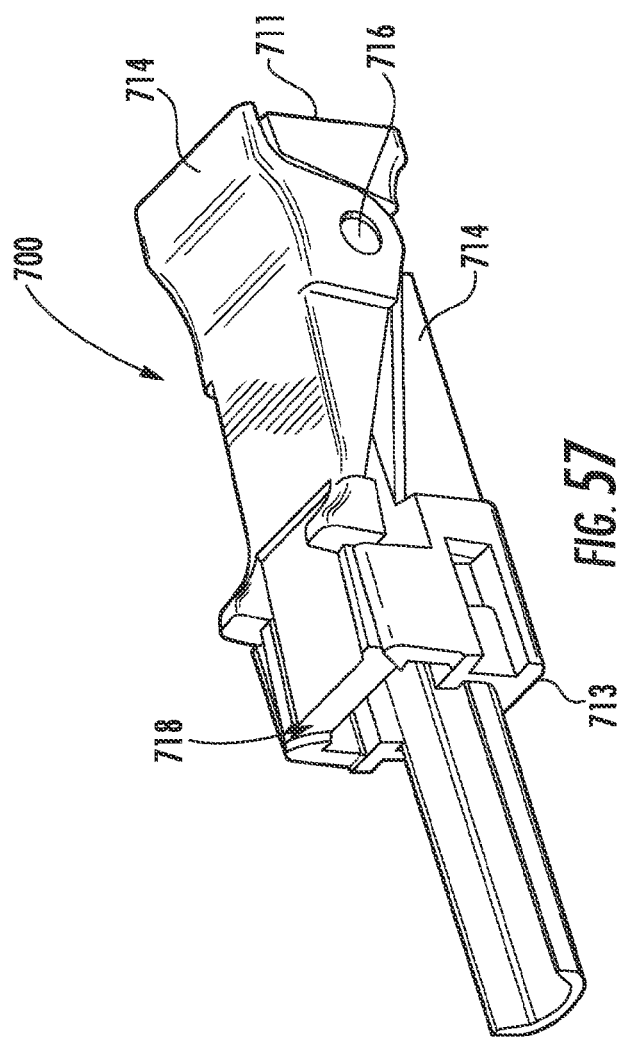
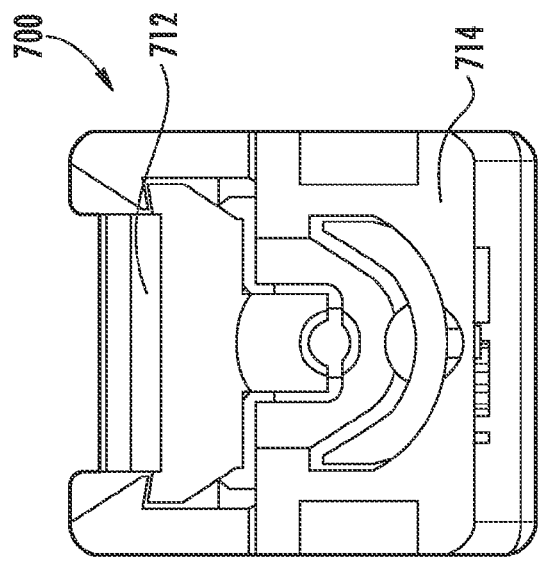
FIG. 57
FIG. 58

TERMINATION SYSTEM FOR FIBER OPTIC CONNECTION

PRIORITY APPLICATION

This application claims the benefit of U.S. Application Ser. No. 61/145,681 filed Jan. 19, 2009 and entitled "TERMINATION SYSTEM FOR FIBER OPTIC CONNECTION," the entire contents of which are hereby incorporated by reference as if presented herein.

BACKGROUND

1. Field

The disclosure is directed to a termination system and components thereof for making a fiber optic connection in a quick, easy, and reliable manner. Specifically, the termination systems disclosed use a handler that attaches to an optical fiber or cable and cooperates with other components for preparing the optical fiber and/or making the optical connection.

2. Technical Background

Optical fiber is increasingly being used for a variety of applications in both public and private networks for broadband voice, video, data transmission, and the like. Benefits of optical fiber use include extremely wide bandwidth and low noise operation. With the increasing and varied use of optical fibers, it is important to provide efficient methods of interconnecting and reconfiguring optical fiber pathways. Fiber optic connectors that mate using an adapter have been developed for this purpose. It is important that fiber optic connectors not significantly attenuate or alter the transmitted signal. Fusion-splicing is one method of providing an optical connector on an end of a cable. Specifically, a factory-polished optical fiber connector pigtail may be fusion-spliced to an end of a fiber optic cable. However, fusion splicing requires a fusion splicer and training for the craftsman.

To overcome the need for a fusion splicer and training, fiber optic connectors were developed that allow a mechanical splice in the field. However, the quality of the mechanical splice can vary widely depending on the design of fiber optic connector, preparation of the optical fiber, alignment of the fibers, installation by the craft, etc. For instance the craft may need to remove buffer layers from the optical fiber and then remove a coating on the optical fiber. Thereafter, the optical fiber may require cleaving to the appropriate length for insertion into the mechanical splice connector. If the optical attenuation of the field splice is too high, the craftsman needs to reconnect the fiber optic connector to achieve a desirable result. For these reasons, termination of fiber optic cables with a simple, reliable, and easy to assemble manner is challenging, especially for the unskilled craftsman. Thus, there is an unresolved a need for a robust fiber optic cable termination that is simple, reliable, and easy to assemble.

SUMMARY

Termination systems and devices disclosed herein use a handler that attaches to the optical fiber or cable and cooperates with other components such as one or more fiber preparation tools for preparing the optical fiber and/or making the optical connection, thereby providing a simple, reliable, and easy termination for the optical fiber (i.e., optical connection). For instance, the handler may cooperate with one or more of the following a strip tool, strip/clean tool, cleave tool for preparing the end of the optical fiber(s), and/or a connector-to-handler adapter of fiber optic connector for making the optical connection.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character as it is claimed. The accompanying drawings are included to provide a further understanding, and are incorporated into and constitute a part of this specification. The drawings illustrate various embodiments, and together with the description serve to explain the principles and operation.

BRIEF DESCRIPTION OF THE FIGURES

FIGS. 4a and 4b respectively are partial cut-away views of the handler of FIG. 1 depicting how the handler attaches to the optical fiber from an open position to a closed position;

FIGS. 5a and 5b respectively are perspective views another embodiment of a handler being attached to a cable and cooperating with a buffer stripper for preparation of the end of the optical fiber;

FIGS. 6a and 6b respectively are perspective views of the handler being attached to a cable and cooperating with a coating stripper and a buffer stripper for preparation of the end of the optical fiber;

FIGS. 7a and 7b respectively depict perspective views of the buffer stripper of FIGS. 5a and 5b and the coating stripper and buffer stripper of FIGS. 6a and 6b being used to prepare the respective ends of the optical fiber;

FIGS. 20-30 depict the concepts of one type of mechanical actuation for making the optical connection between the optical fiber of the handler and the optical fiber stub of the connector-to-handler adapter;

FIGS. 31-37 depict the concepts of another mechanical actuation for making the optical connection between the optical fiber of the handler and the optical fiber stub of the connector-to-handler adapter;

FIG. 38 is a perspective view of another handler and connector-to-handler adapter showing the sheath of the handler being in the extended position;

FIGS. 44-48 depict the concepts of another mechanical actuation for making the optical connection between the optical fiber of the handler and the optical fiber stub of the connector-to-handler adapter;

FIGS. 49-55 depict the concepts of another mechanical actuation for making the optical connection between the optical fiber of the handler and the optical fiber stub of the connector-to-handler adapter; FIGS. 57 and 58 are detailed views of the handler depicted in FIG. 56.

DETAILED DESCRIPTION OF THE PREFERRED EMBODIMENTS

Reference will now be made in detail to the preferred embodiments, examples of which are illustrated in the accompanying drawings. Whenever possible, like reference numbers will be used to refer to like components or parts. Embodiments described herein are explanatory methods and devices for preparing and/or terminating an end portion of a fiber optic cable. Moreover, the concepts disclosed advantageously allow for easily repeatable and reliable terminations by the craft. Reference will now be made in detail to the preferred embodiments, examples of which are illustrated in the accompanying drawings. Whenever possible, like reference numbers will be used to refer to like components or parts.

Figure 1:
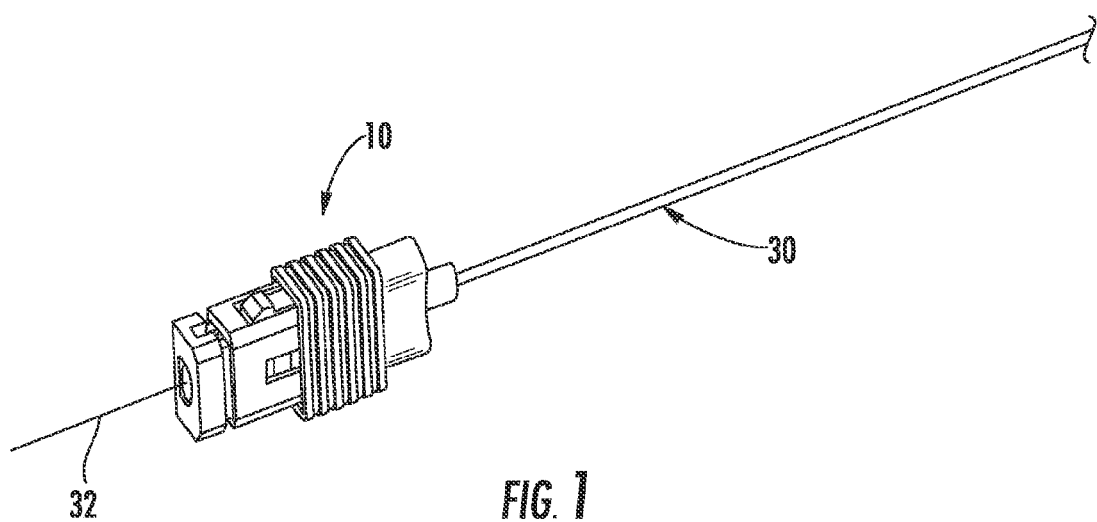
FIG. 1 is a perspective view of one explanatory handler that is attached to an optical fiber prior.

FIG. 1 is a perspective view of explanatory fiber handler 10 (hereinafter handler) that is attached to an optical fiber cable 30 (hereinafter cable). Cable 30 has one or more protective layers such as a buffer layer 34 (FIG. 2) disposed over optical fiber 32, but other cable 30 constructions are possible. Handler 10 is advantageous, because it makes field termination simple, quick and reliable. Specifically, handler 10 is secured to buffer layer 34 of cable 30 and optical fiber 32 extends from a front end of the handler 10, thereby allowing the handler to engage one or more other devices for optical fiber preparation and/or termination (e.g., fiber preparation tools or termination structures). In other embodiments, the handler may be directly secured to the optical fiber, cable jacket or the like; simply stated, the handler secures and inhibits the optical fiber from moving, thereafter the handler can cooperate with suitable preparation tools and/or termination structures. For instance, suitable termination structures for cooperating with the handlers disclosed include structures for fusion splicing or mechanical splicing such as fiber optic connectors or connector-to-handler adapters.

By way of example, typical method steps include inserting the optical fiber and/or cable into the handler, securing the optical fiber and/or cable to the handler, stripping the buffer and/or optical fiber coating, and cleaving the optical fiber to length. The handlers disclosed herein are useful for making preparation of the optical fiber and termination of the same simple, easy, and repeatable even for untrained personnel. In other words, untrained craft can make high-quality fiber optic terminations by securing the optical fiber in the handler and using the handler in cooperation with other components by making the procedure quick and easy. For instance, using the handler eliminates steps such as measuring and marking the optical fiber length for stripping one or more coatings therefrom.

Figure 2:
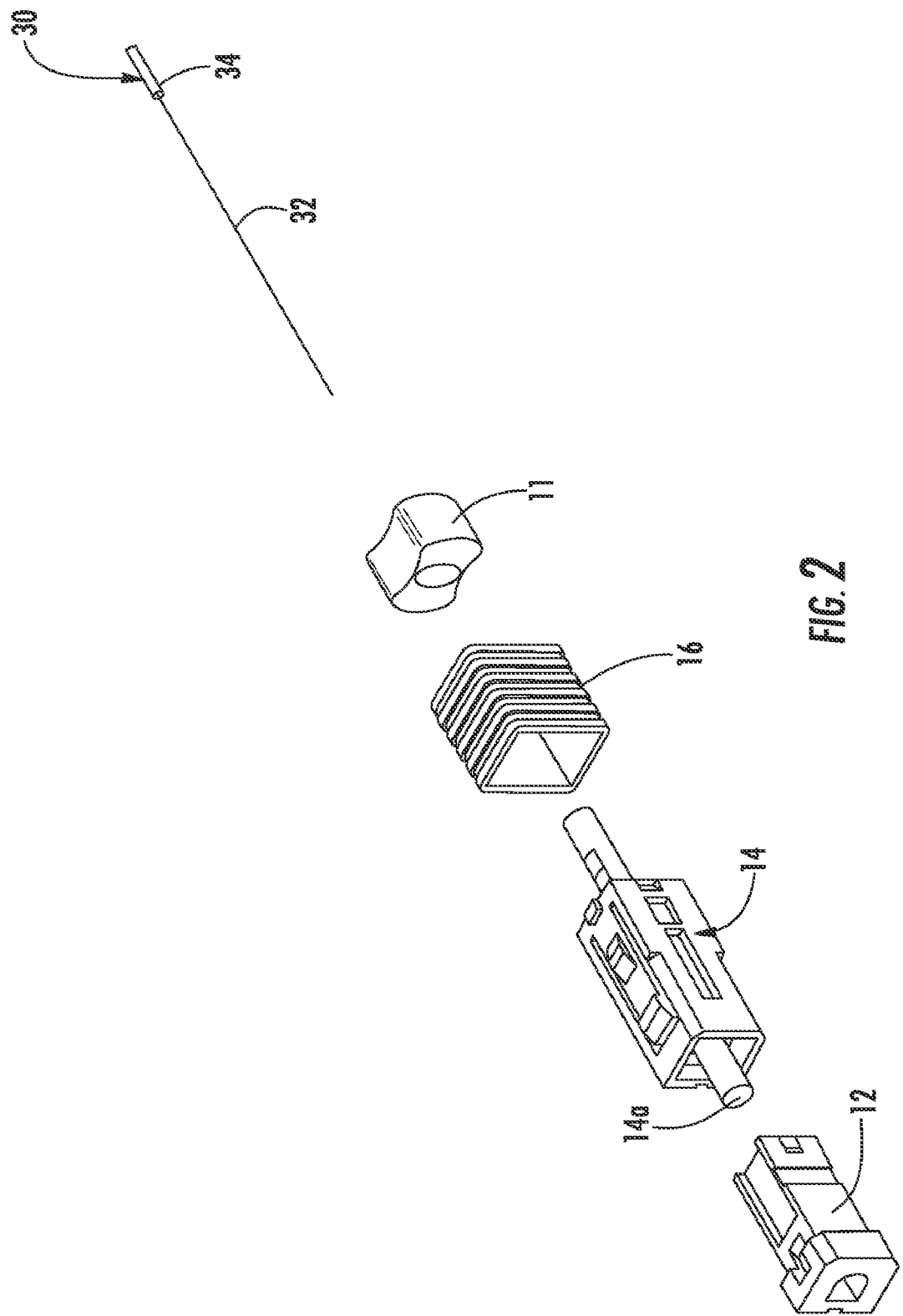
FIG. 2 is an exploded view of a handler of FIG. 1.
Figure 3:
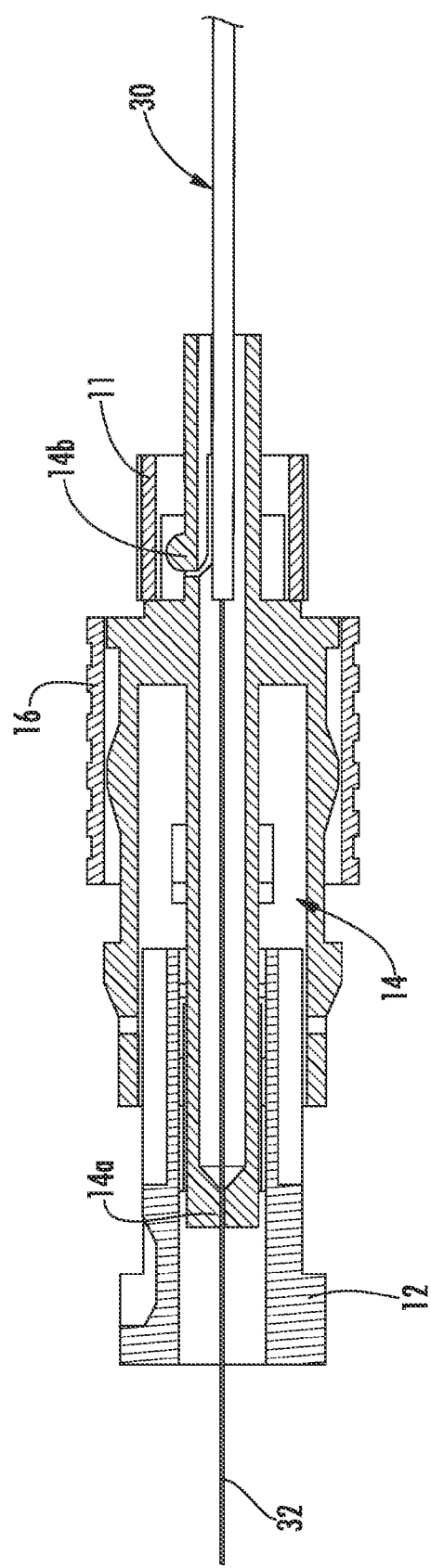
FIG. 3 is a cross-sectional view of the handler of FIG. 1 attached to an optical fiber cable.

FIG. 2 is a partially exploded view of a first handler 10 showing a securing mechanism or securing member such as a cam 11, a fiber support 12 such as a shroud that is movable for protecting optical fiber 32, a handler body 14, and a cover 16. FIG. 3 depicts a cross-sectional view of handler 10 secured to cable 30. Cam 11 is used for securing handler 10 with cable 30. Simply stated, cable 30 is inserted into the assembled handler 10 until suitable seated (i.e. a suitable length is inserted) and then cam 11 is rotated for securing to a buffer layer (not numbered) of cable 30. More specifically, cable 30 is inserted into the passageway of cam 11 and is guided into and through a bore 14a or passageway of handler body 14. As shown by FIG. 3, cable 30 is inserted so that optical fiber 32 extends beyond shroud 12. By way of example, the shroud 12 may acts as a fiber support that protects the cleaved fiber and endface and/or a guide for mating with other devices. As depicted, a portion of the buffer layer of cable 30 and the optical fiber coating is stripped before insertion into handler 10. However, other embodiments of handlers may not need a portion of the buffer layer and/or optical fiber coating removed before securing the same to the cable. Additionally, handler 10 allows the release and removal of the cable 30 or the optical fiber from the same.

FIGS. 4a and 4b respectively are partial cut-away views of handler 10 showing how the handler is secured to cable 30. Specifically, a rear portion of handler body 14 is shown in cross-section illustrating the securing function of the same. FIG. 4a depicts cam 11 in the open position (i.e., not secured to the cable) and FIG. 4b depicts cam 11 rotated to the closed position for securing handler 10 to cable 30. As shown, the passageway of cam 11 has an oval shape for pushing a gripping lever 14b of handler body 14 into the buffer layer of cable 30. In other words, as cam 11 is rotated from the open position to the closed position the oval passageway contacts a bulbous portion of the gripping lever 14b and forces the same into the buffer layer of cable 30. Consequently, cable 30 is secured to handler 10 which can interface with other devices for fiber/cable preparation tasks, connectorization, or the like, thereby making these tasks simple, easy, and repeatable for the craft. For instance, handler 10 has suitable geometry for snap-fitting or the like to other devices for further preparation and/or connectorization.

Additionally, handler 10 can be removed from cable 30 by rotating cam 11 to the open position; thus, allowing gripping lever 14b to spring back so that cable 30 can be removed if desired. Of course, other types and/or configurations of handlers are possible for securing to the cable. For instance, securing the cable to the handler does not require a cam.

Figure 4C:
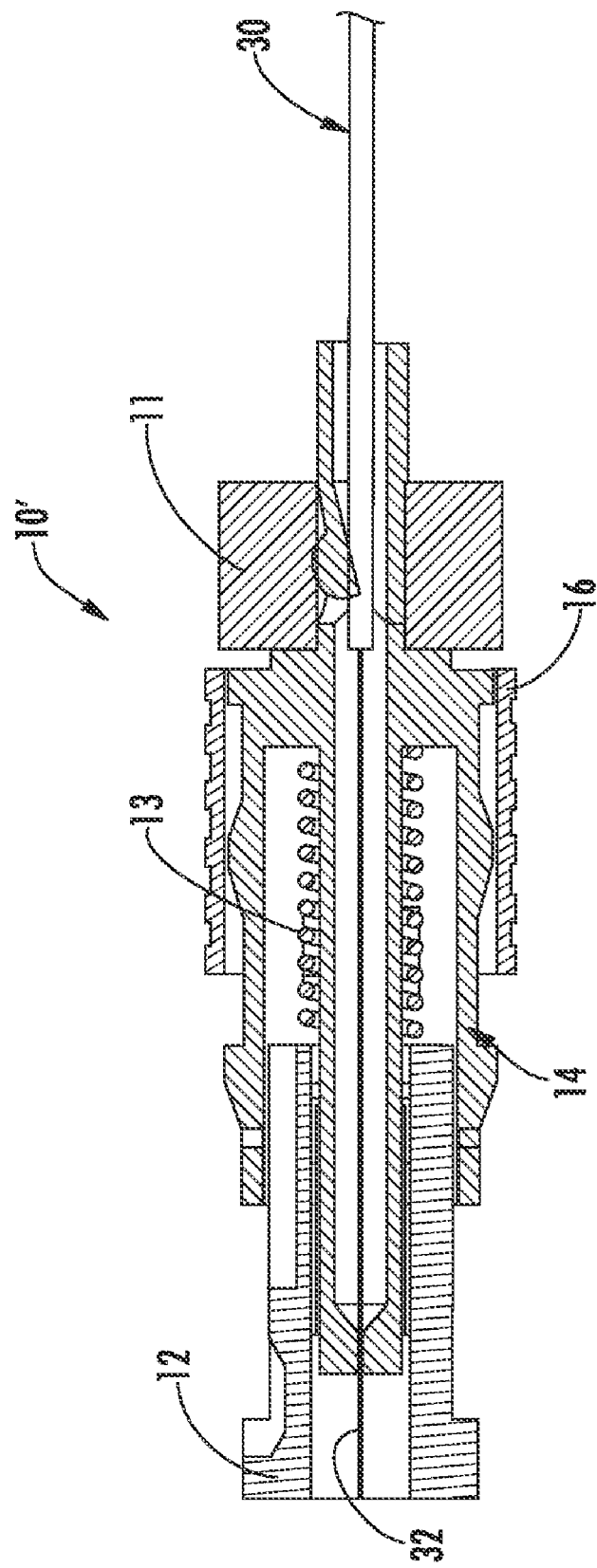
FIGS. 4c and 4d respectively are partial cut-away views of another handler that is similar to the handler of FIG. 1 depicting the handler with the shroud extended and retracted.
Figure 4D:
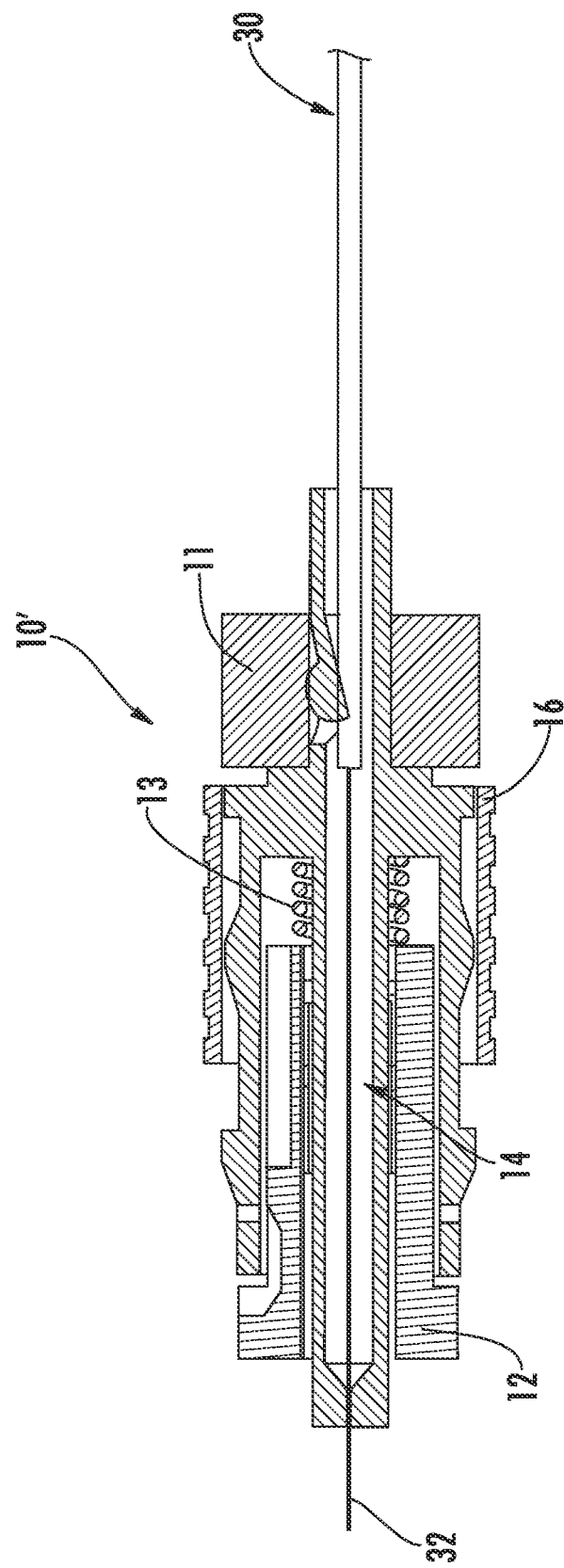

Illustratively, FIGS. 4c and 4d show partial cut-away views of another handler 10' that is similar to the handler 10. As shown, FIGS. 4c and 4d depict handler 10' with the shroud respectively in the extended and retracted positions. In this embodiment, shroud 12 is biased forward by a resilient member 13 so that it is normally extend as shown in FIG. 4c. When shroud 12 is pushed inward resilient member 13 such as a compression spring compresses as shown in FIG. 4d, thereby by exposing optical fiber 32 of cable 30. Other embodiments of handlers can also include a resilient member for biasing the shroud.

FIGS. 5a and 5b respectively are perspective views of another handler 20 being attached to cable 30. Handler 20 allows cooperation with a buffer stripper 40 for preparation of the end of the optical fiber by removing a portion of the buffer layer. As shown, handler 20 has a hinged design allowing it to open for inserting cable 30 therein and clamping using a latch to secure the same. In this embodiment, the hinge (i.e., the pivot axis) is essentially aligned with the passageway that receives the optical fiber. Additionally, handler 20 has suitable geometry for cooperating with other devices. Likewise, a buffer stripper 40 is shown with a hinged design allowing it to open for inserting cable 30 therein and clamping using a latch to secure the same. Handler 20 and buffer stripper 40 can have cooperating geometry so that a portion of buffer stripper 40 fits within and/or attaches to handler 20 as best visible in FIG. 7a. For instance, buffer stripper 40 can have latches (not numbered) that engage and position buffer stripper 40 with respect to handler 20 and then are pressed to disengage the same. The overall length of the stripper can be selected to function as a stripping gauge or fiber measurement guide. In other words, when the craft views the optical fiber lining up with or extending from a far end of the stripper 40 they know a suitable length of the optical fiber is being stripped for the termination and connectorization process (i.e., cleaving and connectorization).

FIGS. 6a and 6b respectively are perspective views of yet another handler 50 being attached to cable 30 and cooperating with buffer stripper 40 and a coating stripper 60 for preparation of the end of the optical fiber by removing both a portion of the buffer layer and a portion of the coating of the optical fiber. Coating stripper 60 is also a hinged design that fits over cable 30 where the hinge (i.e., pivot point) is essentially aligned with the passageway (i.e., essentially parallel) that receives the optical fiber essentially aligned with the passageway that receives the optical fiber. Other variations of the handler may use two separate portions that snap-fit together without being attached by a hinge. As shown, buffer stripper 40 and coating stripper 60 interlock and buffer striper 40 has latches (not numbered) that engage and position buffer stripper 40 with respect to handler 20 and then are pressed to disengage the same. FIGS. 7a and 7b respectively depict perspective views of the buffer stripper 40 of FIGS. 5a and 5b and the coating stripper 60 and buffer stripper 40 of FIGS. 6a and 6b being used to prepare the respective ends of the optical fiber. As shown, the respective devices have latches that are pushed to release the same from the handler and then are pulled in the direction of the mows for removing portions of the buffer layer and/or fiber coating. This performs the stripping of the buffer layer and/or optical fiber coating in one quick, simple, and reliable operation. Thereafter, the stripped optical fiber is secured in handler 20 and ready for the next operation. The devices such as the buffer stripper 40 and coating stripper 60 may have designs that are suitable for a single use and then disposed or suitable for many uses until they are worn-out, blades replaced, or the like.

Figure 8:
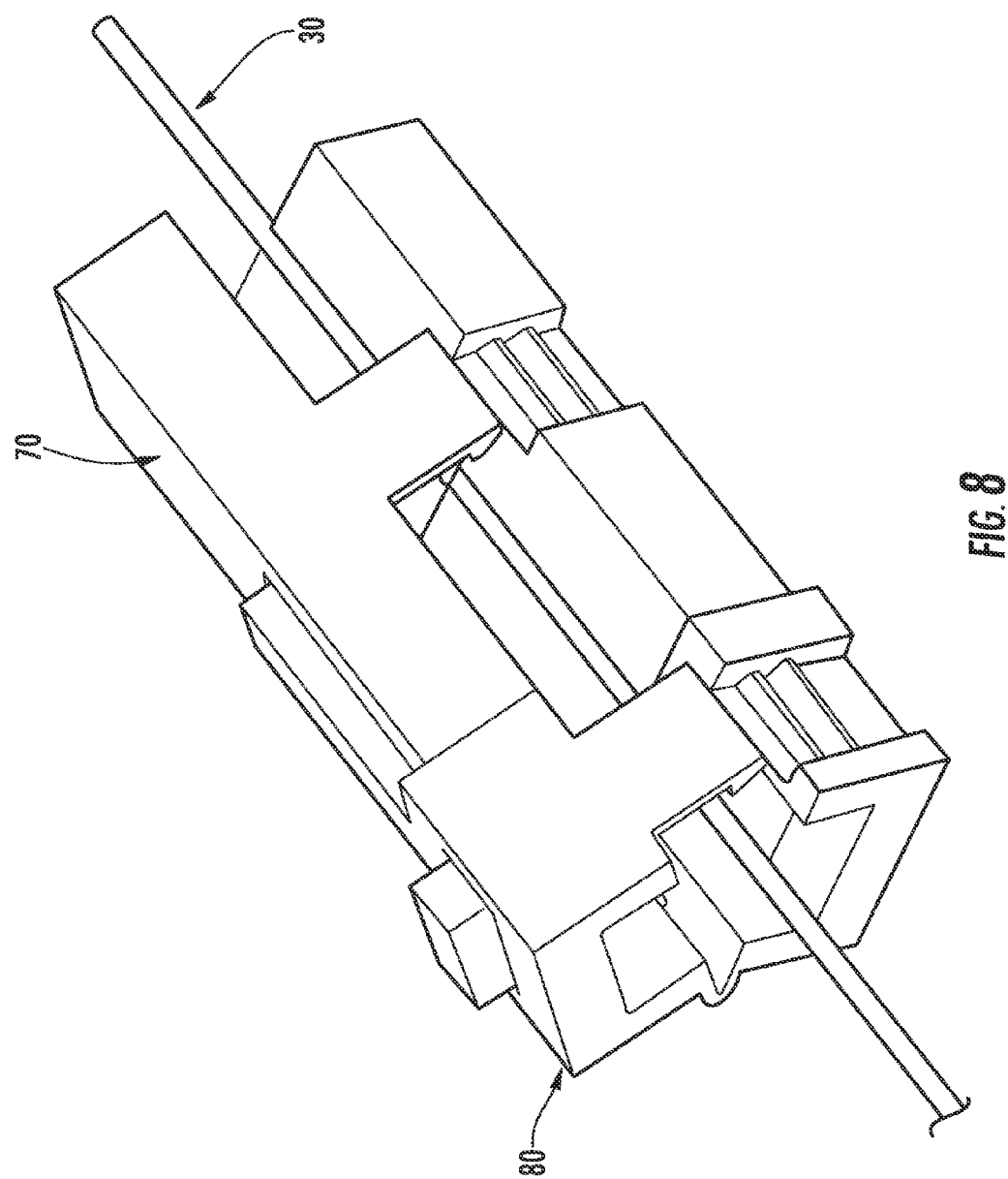
FIGS. 8-12 depict another embodiment of a handler that cooperates with a device for preparing an end of the cable.
Figure 9:
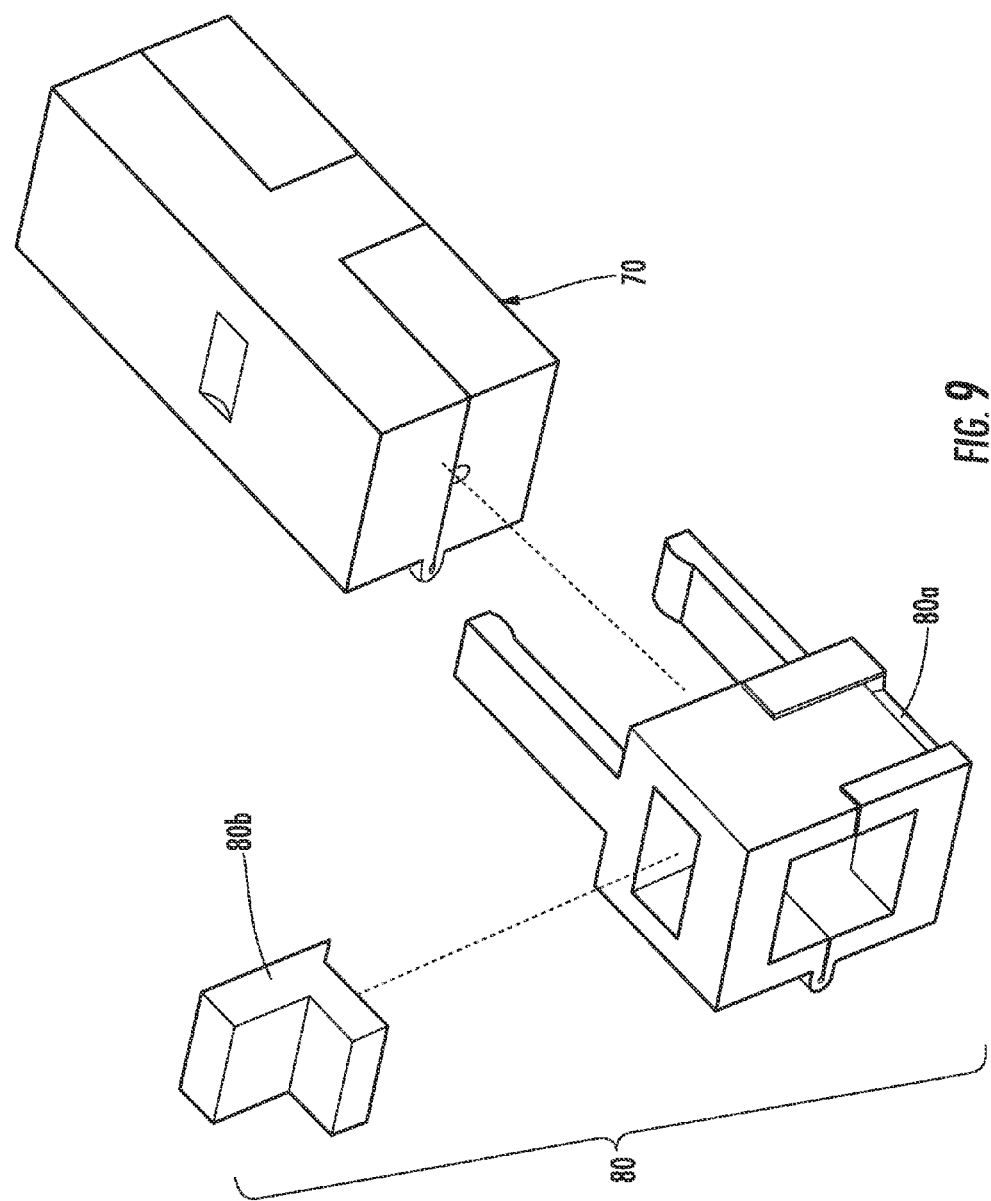
Figure 10:
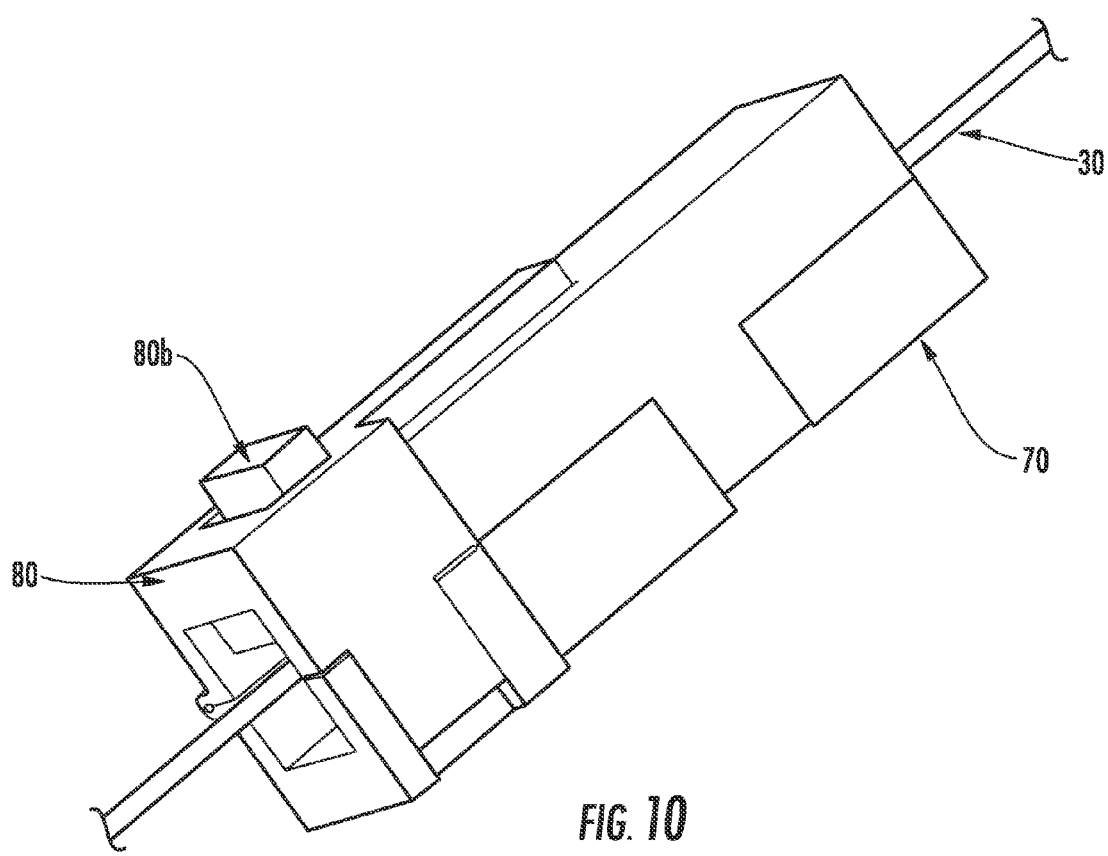
Figure 11:
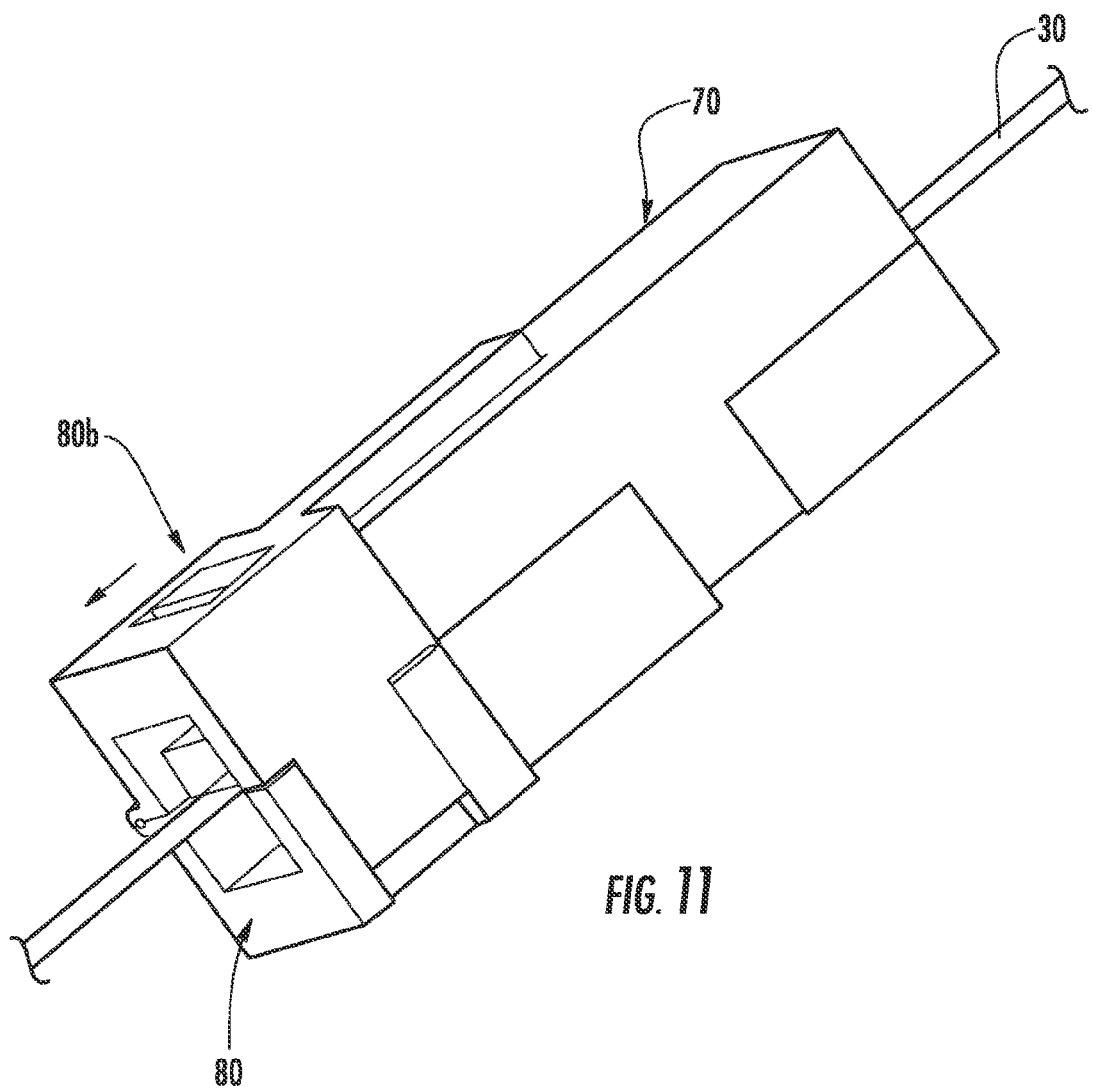
Figure 12:
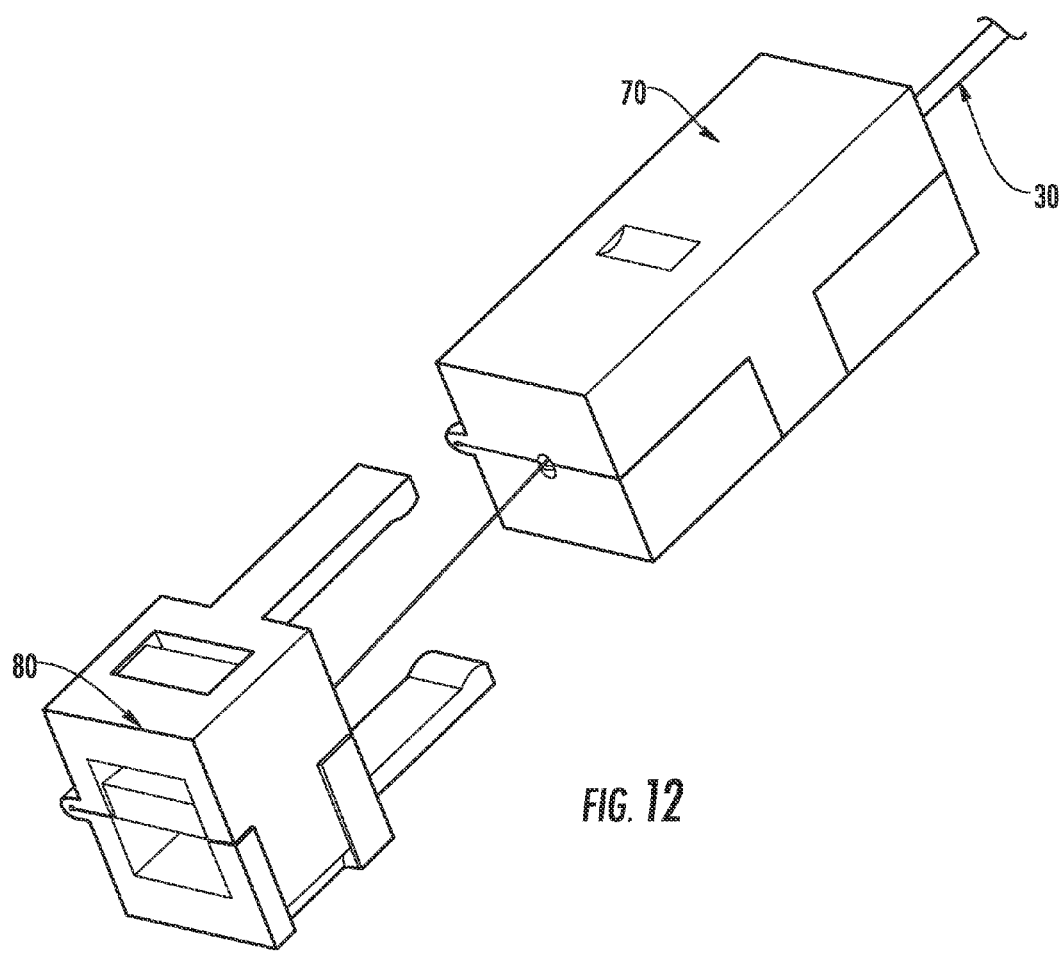

Other variations can integrate a buffer stripper and a coating stripper into one device. Illustratively, FIGS. 8-12 depict another embodiment of a handler 70 that cooperates with a stripping device 80 that is suitable for both stripping the buffer layer and stripping the fiber coating. FIG. 8 shows handler 70 and stripping device 80 with a hinged design being positioned over cable 30 and using latches for securing it to the same. As shown in FIG. 9, stripping device 80 has arms (not numbered) with respective bosses (not numbered) that engage respective indentations (not numbered) on handler 70 so that the devices cooperate for easy alignment and positioning on cable 30. Stripping device 80 has a body 80a and a buffer layer cutter 80b. Buffer layer cutter 80b that fits into body 80a and is suitable for cutting into the buffer layer of cable 30. Additionally, stripping device 80 has internal blades (not visible) forward of the buffer layer cutter for removing the optical fiber coating. FIG. 10 shows the handler 70 and stripping device 80 disposed on cable 30 with the respective latches in the closed position. When the latches of the stripping device are in the closed position the internal blades clamp into the optical fiber coating. Thereafter, as shown in FIG. 11, the buffer layer cutter 80b of stripping device 80 is pushed down to cut into the buffer layer and then it is slide forward to push the buffer layer forward. This aids in stripping of the coating of the optical fiber since it inhibits the build-up of the coating on the buffer layer during stripping. Finally, the stripping device 80 can be pulled forward away from handler 70 as depicted by the arrow in FIG. 12, thereby removing both the buffer layer and the optical fiber coating in one step. In this embodiment, stripping device 80 is intended for one use and then disposed and the optical fiber in the handler is ready for the next step.

Figure 13:
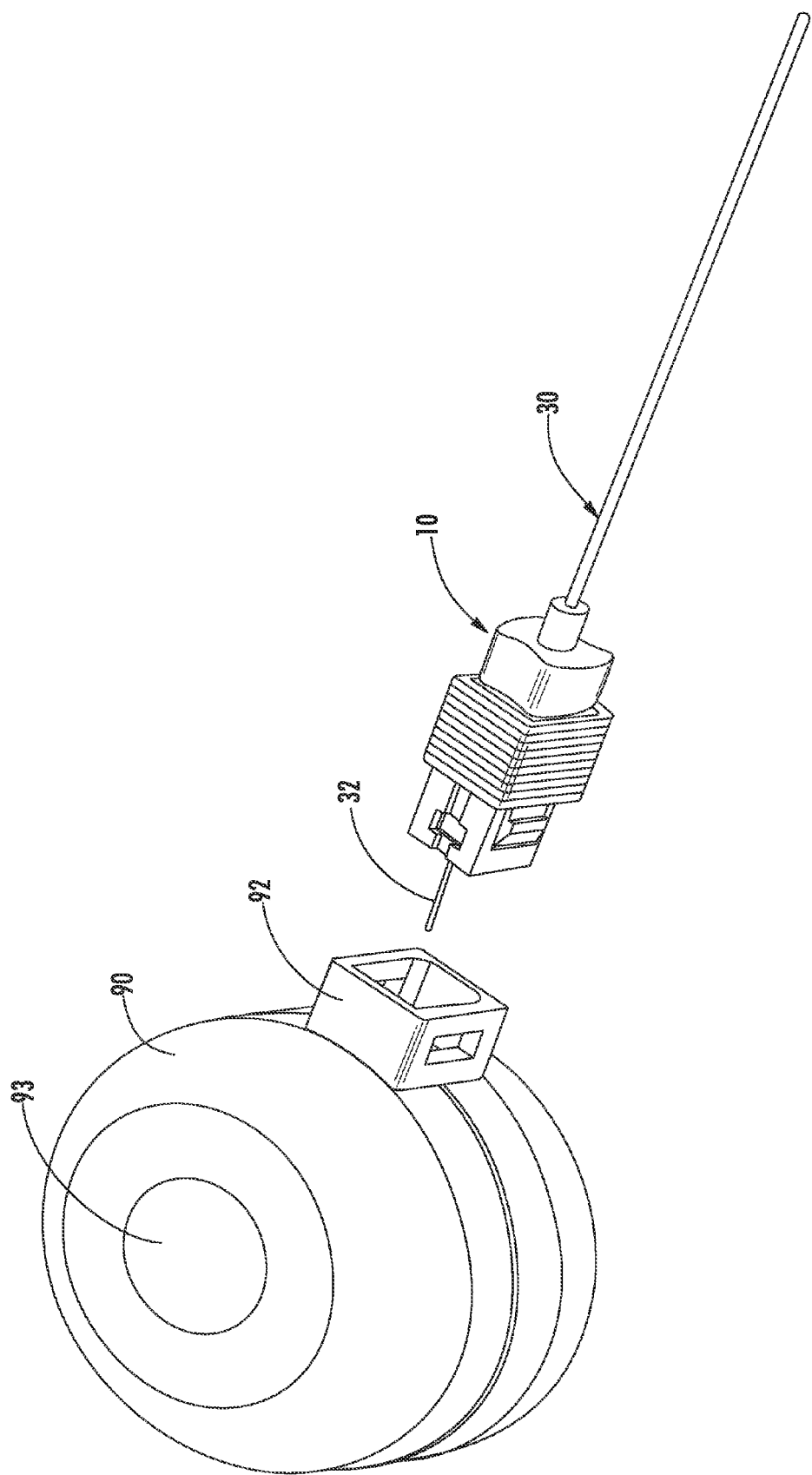
FIG. 13 is a perspective view of the handler of FIG. 1 being inserted into a cleaver for cutting the optical fiber to the desired length for termination.
Figure 14:
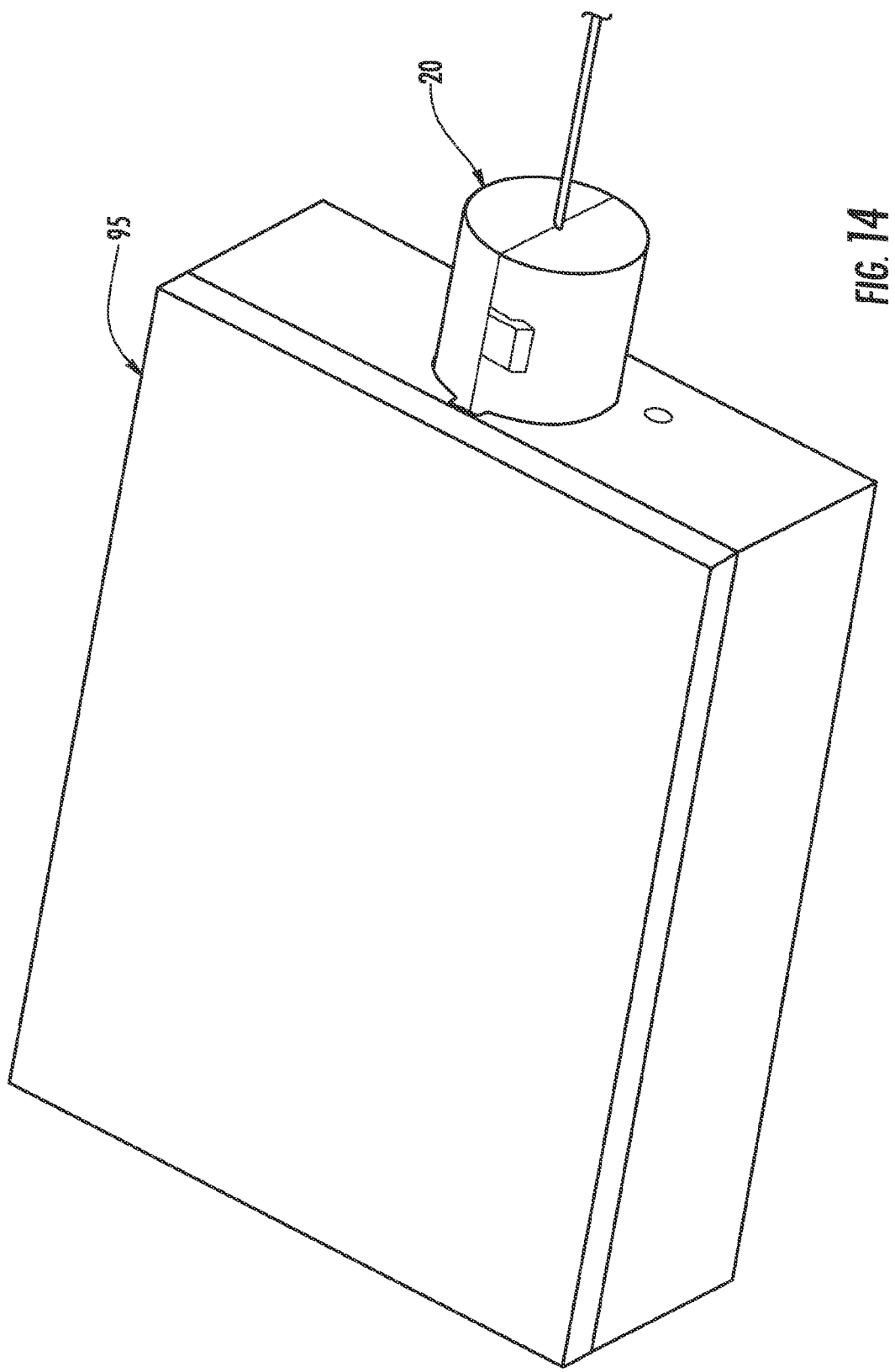
FIG. 14 is a perspective view of the handler of FIG. 5a inserted into a combination clean/cleave device for stripping the coating of the optical fiber and cleaving the optical fiber to the desired length for termination.

FIG. 13 is a perspective view of the handler of FIG. 1 being inserted into a cleaver 90 for cutting the optical fiber to the desired length for termination. Cleaver 90 includes an interface 92 for aligning and positioning handler 10 therewith, thereby assuring that the optical fiber is cleaved to the correct length for termination. As shown, interface 92 has recesses (not numbered) that snap-fit with bosses (not numbered) on handler 10 for allowing repeatable cleave lengths; however, the cleaver can have any suitable geometry for interfacing with the handler. Interface 92 may include a keying feature for aligning with a complementary keying feature on the handler. Cleaver 90 also includes a button 93 for cleaving the optical fiber when pushed. In other embodiments, the cleaver can be incorporated with a buffer stripper and/or an optical fiber coating stripper. FIG. 14 is a perspective view of handler 20 inserted into a combination optical fiber coating cleaner/cleave device 95 for stripping the coating of the optical fiber and cleaving the optical fiber to the desired length for termination in one step. Of course, other variations are possible.

Figure 15:
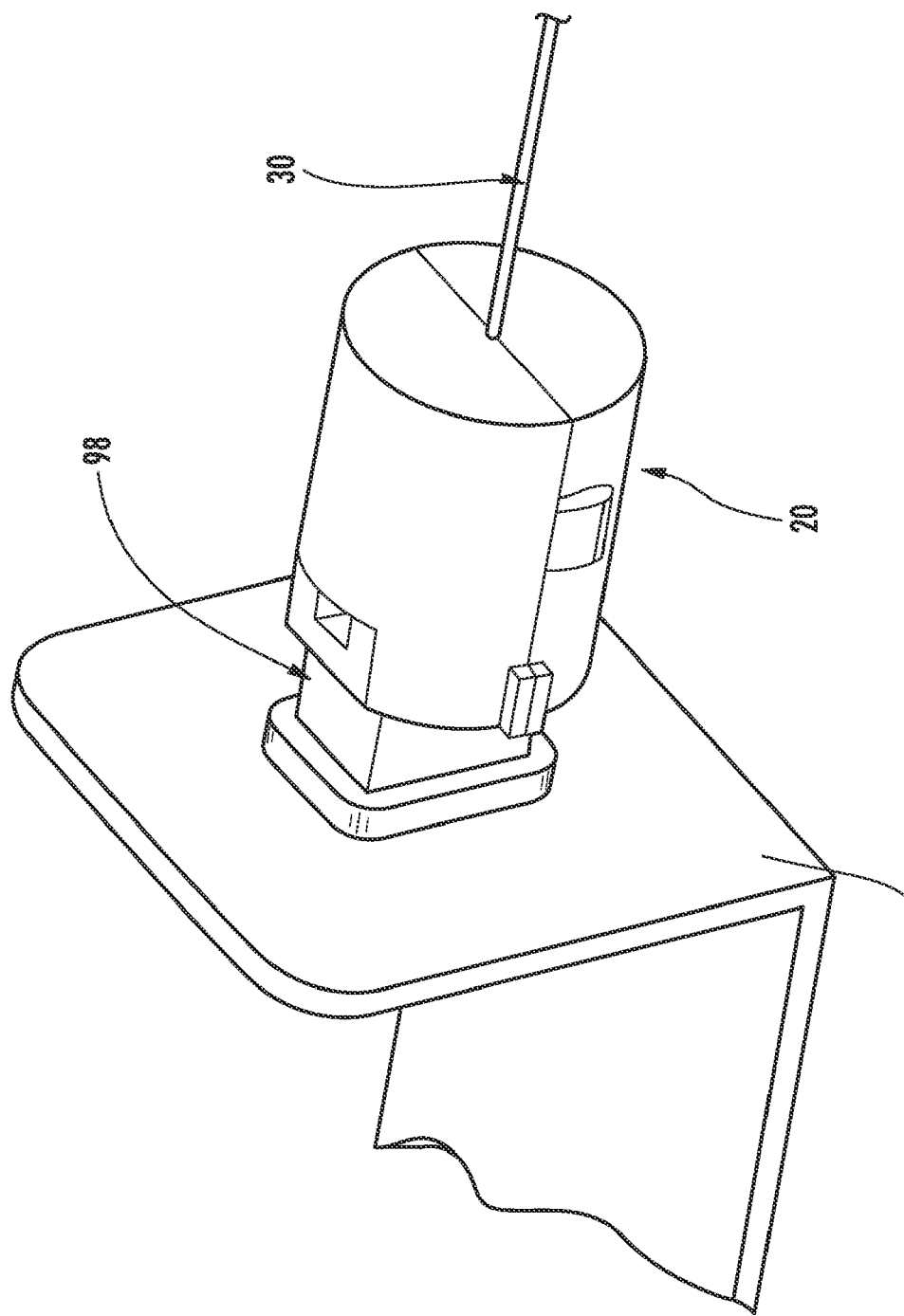
FIG. 15 is an explanatory environmental view of the handler of attached to a connector-to-handler adapter that is attached to a panel for optical connection.

FIG. 15 depicts an explanatory environmental view of handler 20 of attached to a connector-to-handler adapter 98 mounted on a panel 95. When handler 20 is properly prepared and inserted into the connector-to-handler adapter an optical connection (i.e., a termination) is made with an optical fiber connector that is attached to the other end of the connector-to-handler adapter. Connector-to-handler adapters can also be mounted on other structures such as patch panels, adapter panels, wall-mount boxes, modules, junction boxes, and the like. Of course, other handlers and/or connector-to-handler adapters may be used and/or can have these types of mounting configurations.

Figure 16:
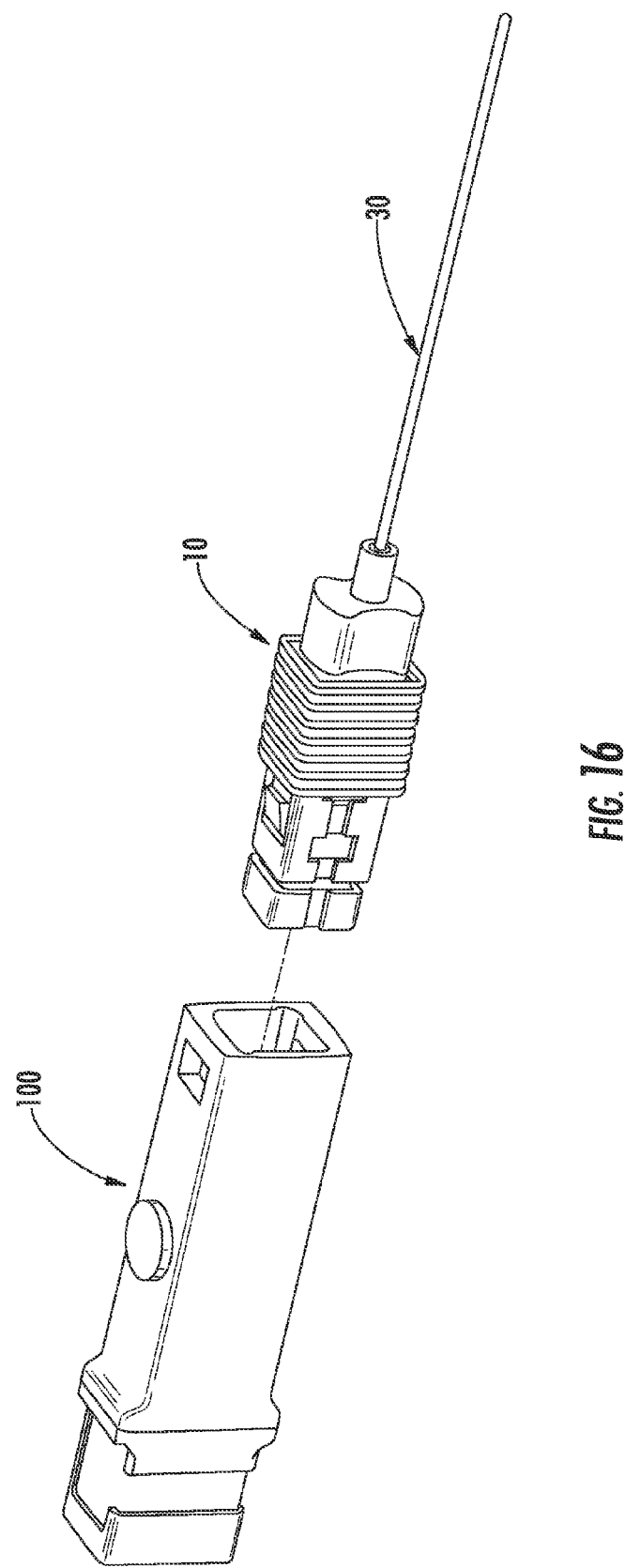
FIGS. 16 and 17 respectively are perspective views of another handler before and after being attached to a connector-to-handler adapter for optical connection.
Figure 17:
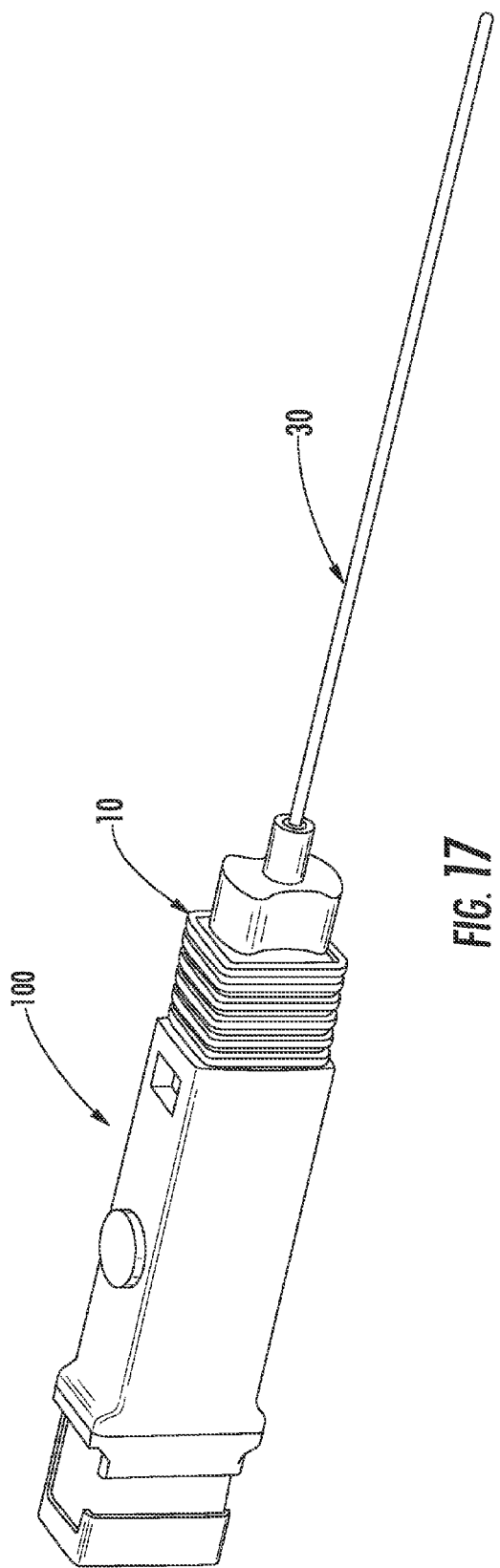

FIGS. 16 and 17 respectively are perspective views of handler 10 before and after being attached to a connector-to-handler adapter 100 for optical connection. As discussed above cable 30 is attached to handler 10 and the optical fiber was prepared for termination (i.e., insertion of the handler into the connector-to-handler adapter for optical connection). In other words, the buffer layer and optical fiber coating were stripped leaving the core and cladding, which was then cleaved to the desired length.

Figure 18:
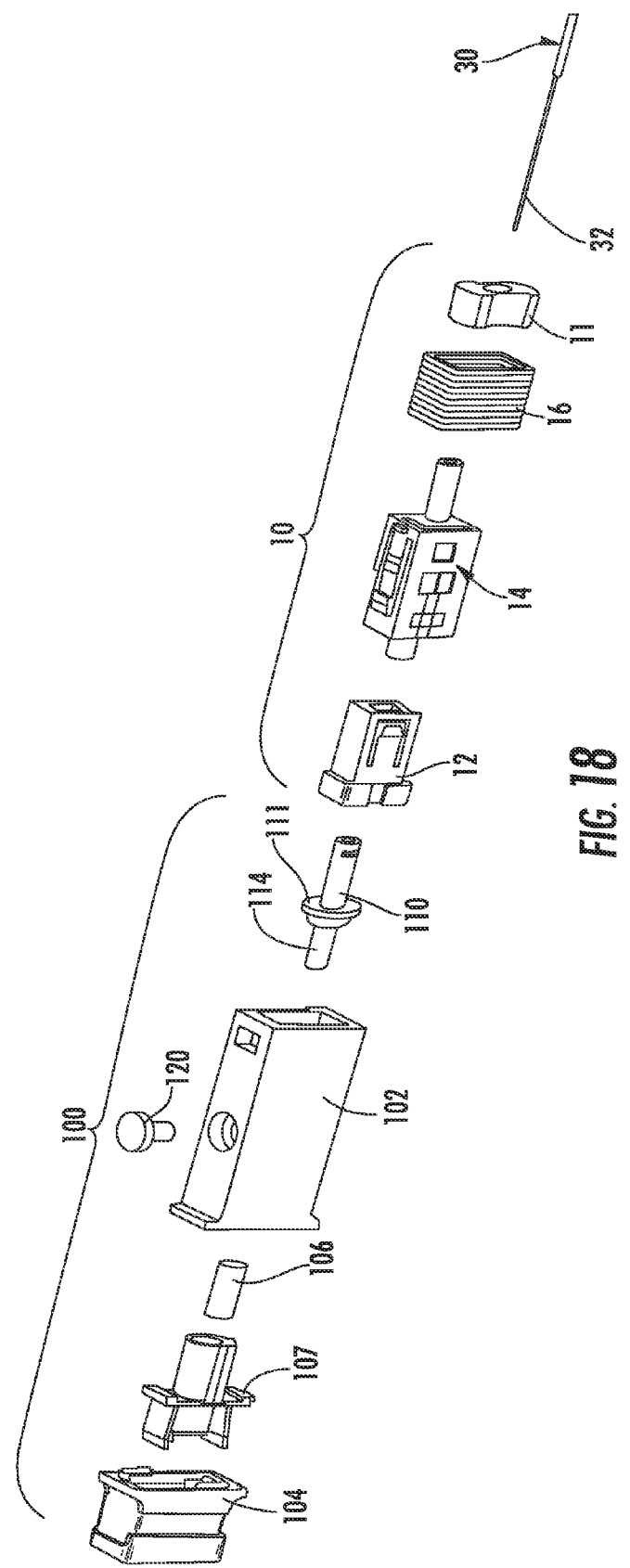
FIG. 18 is a partially exploded view of the handler and connector-to-handler adapter of FIGS. 16 and 17.

FIG. 18 is a partially exploded view of handler 10 and the connector-to-handler adapter 100. Connector-to-handler adapter 100 mates with handler 10 for making a quick, easy, and reliable termination. For instance, handler 10 can mechanically attach to connector-to-handler adapter 100 such as latching thereto and making the termination using a mechanical actuation. Connector-to-handler adapter 100 is different from conventional adapter because conventional adapters receive optical connectors in respective end for mating the same. On the other hand, connector-to-handler adapter 100 only receives a connector on one end and the other end receives handler 10 as shown in FIG. 17. Although, this embodiment shows connector-to-handler adapter 100 including a ferrule adapter at the rear portion other embodiments can be configured as an optical fiber jack (i.e., does not receive a fiber optic connector), have handlers inserted at each end, or the like.

Connector-to-handler adapter 100 includes a housing having a main body 102 and an end cap 104, but other housings may have a one-piece configuration. At one end (i.e., the rear portion) connector-to-handler adapter 100 includes a coupler 107 and an alignment sleeve 106. When assembled, alignment sleeve 106 is received within coupler 107. In this embodiment, coupler 107 receives a termination assembly 110 at the other opposing end (i.e., the front end), which can be mated with a fiber optic connector (not shown) at the rear end. Termination assembly 110 is actuated by a splice activation 120, thereby securing termination. Consequently, connector-to-handler adapter 100 can be mounted to a structure such as patch panels, adapter panels, wall-mount boxes, modules, junction boxes, and the like for receiving a fiber optic connector at the rear portion for engaging coupler 107. By way of example, the rear end of the coupler can be configured for engaging and securing and suitable fiber optic connector interface such as SC, ST, LC, or the like.

Figure 19:
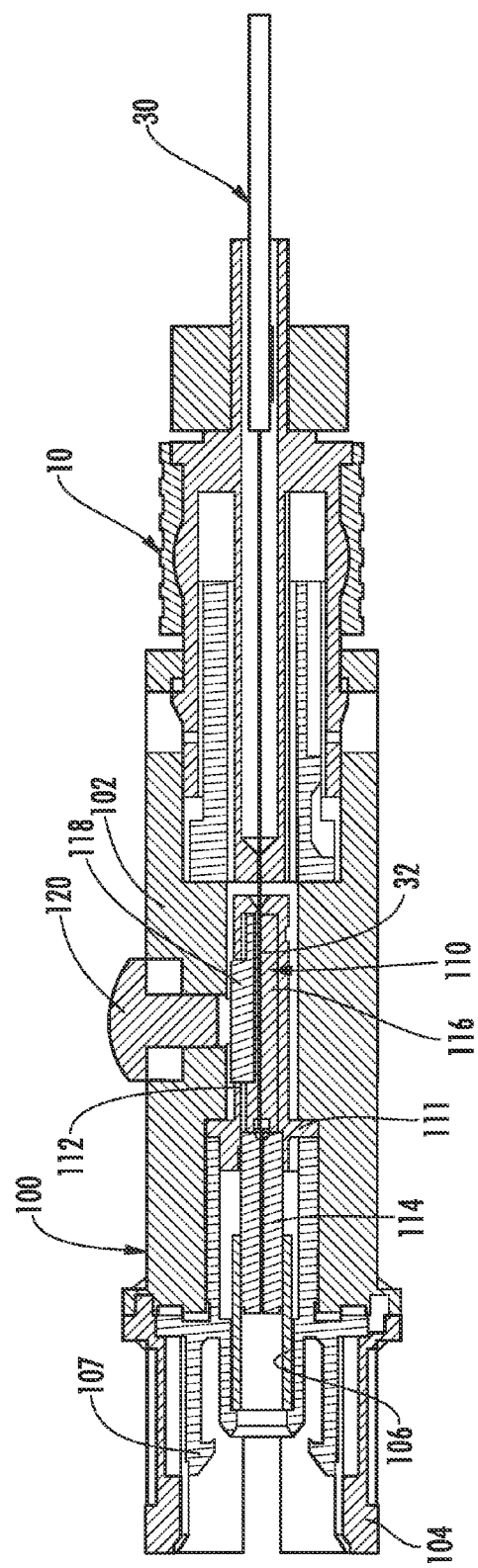
FIG. 19 is a cross-sectional view of the mated handler and connector-to-handler adapter of FIG. 17.
Figure 20:
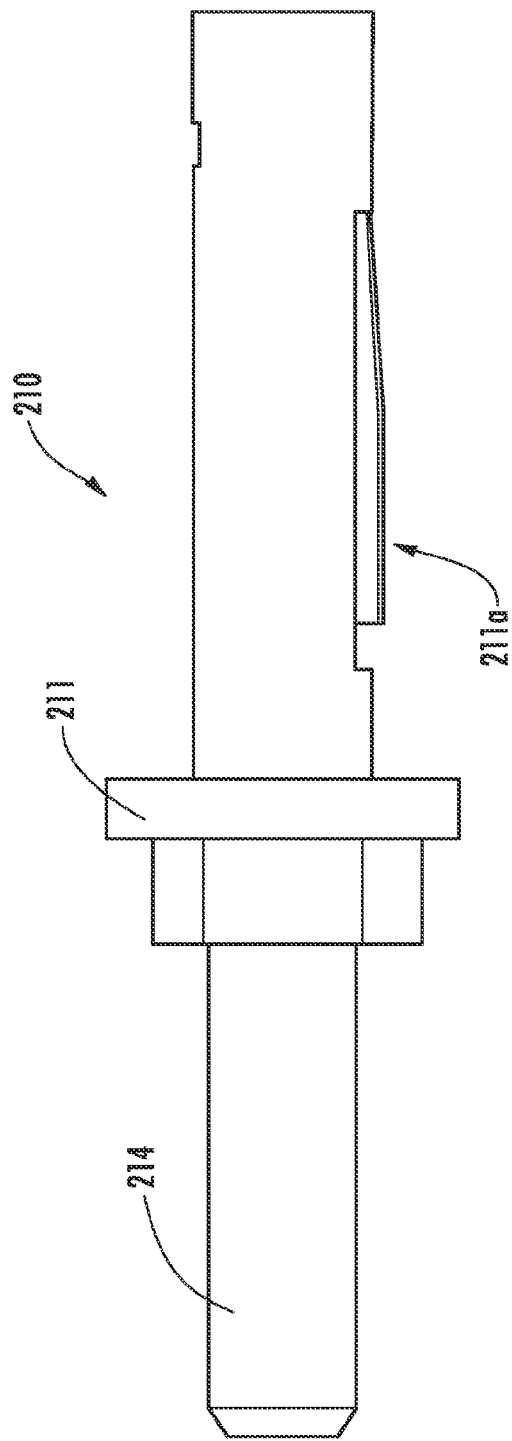
Figure 21:
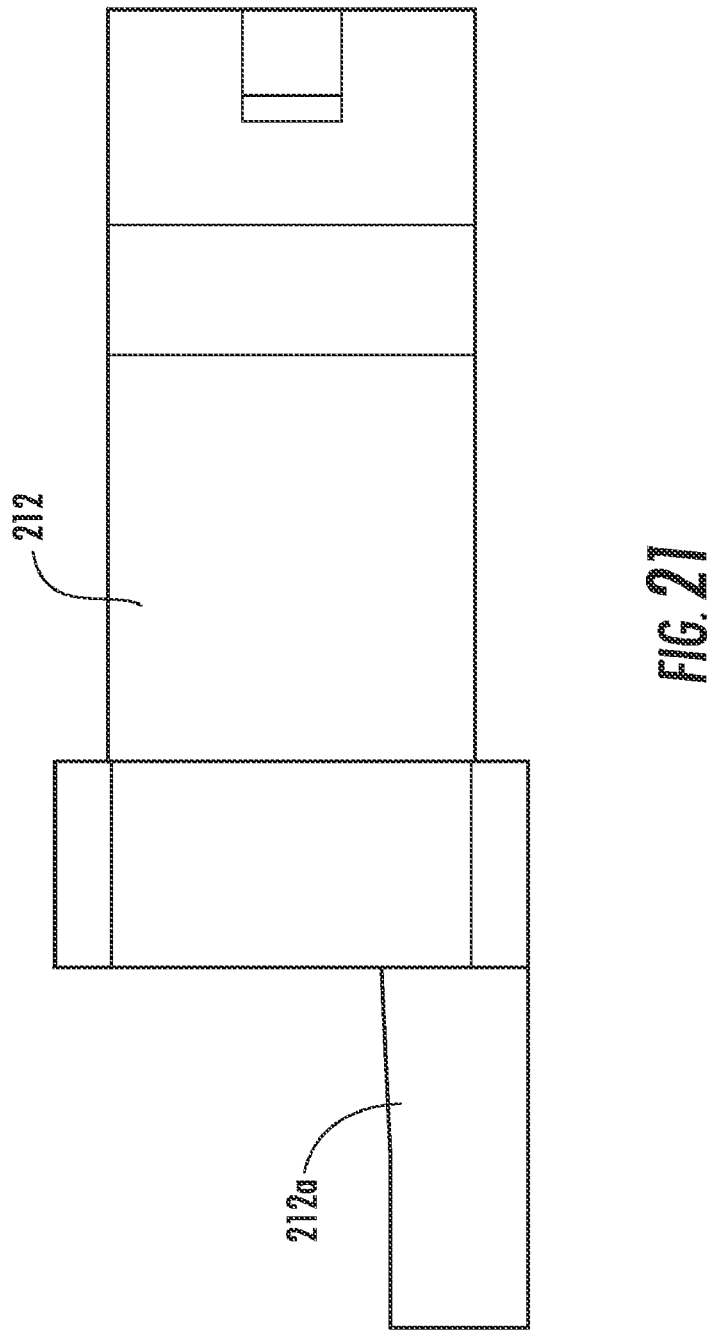

As best shown in cross-sectional FIG. 19, termination assembly 110 includes a holder 111, an optical fiber stub 112, a ferrule 114, and splice part such as bottom splice part 116 and top splice part 118. Holder 111 has ferrule 114 secured thereto at the rear portion. Ferrule 114 includes optical fiber stub 112 attached thereto and extending therefrom for making an optical connection with optical fiber 32 as shown. Holder 111 also includes splice parts therein for aligning optical fiber stub 112 with optical fiber 32. Specifically, optical fiber stub 112 is disposed between the splice parts along with optical fiber 32 when the prepared handler 10 is attached to connector-to-handler adapter 100. In this embodiment, termination assembly 110 includes a bottom splice part 116 and a top splice part 118 that cooperate to align and secure optical fiber stub 112 with optical fiber 32 for making a mechanical splice therebetween. The splice parts form a groove or small passageway therebetween for aligning and securing the optical fibers. Additionally, the splice parts may form lead-in portions on each end for aiding in receiving the optical fibers on each end of the splice parts. For instance, this embodiment uses a mechanical actuation employing splice activation 120 which engages top splice part 118 for pushing it towards the bottom splice part 116, thereby forming the mechanical splice by clamping optical fiber stub 112 and optical fiber 32 therebetween.

Simply stated, after handler 10 is prepared with cable 30 as shown in FIG. 16 and then inserted and secured to connector-to-handler adapter 100 as shown in FIG. 17, optical fiber 32 and optical fiber stub 112 are abutted together. Thereafter, splice activation 120 is pushed into main body 102, which pushes on the protrusion (not numbered) of top splice part 118 which is exposed through holder 111. Although this embodiment depicts a splice activation that that is not releasable or reversible, other splice activations may have a releasable or reversible feature for the splice activation. The handler 10 and cooperating structure may also include complimentary keying features for aligning and guiding the parts into the proper orientation for mating. Moreover, the structures can have any suitable type of securing or latching mechanism for keeping the parts mated and/or releasing the parts in a reversible manner.

Figure 22:
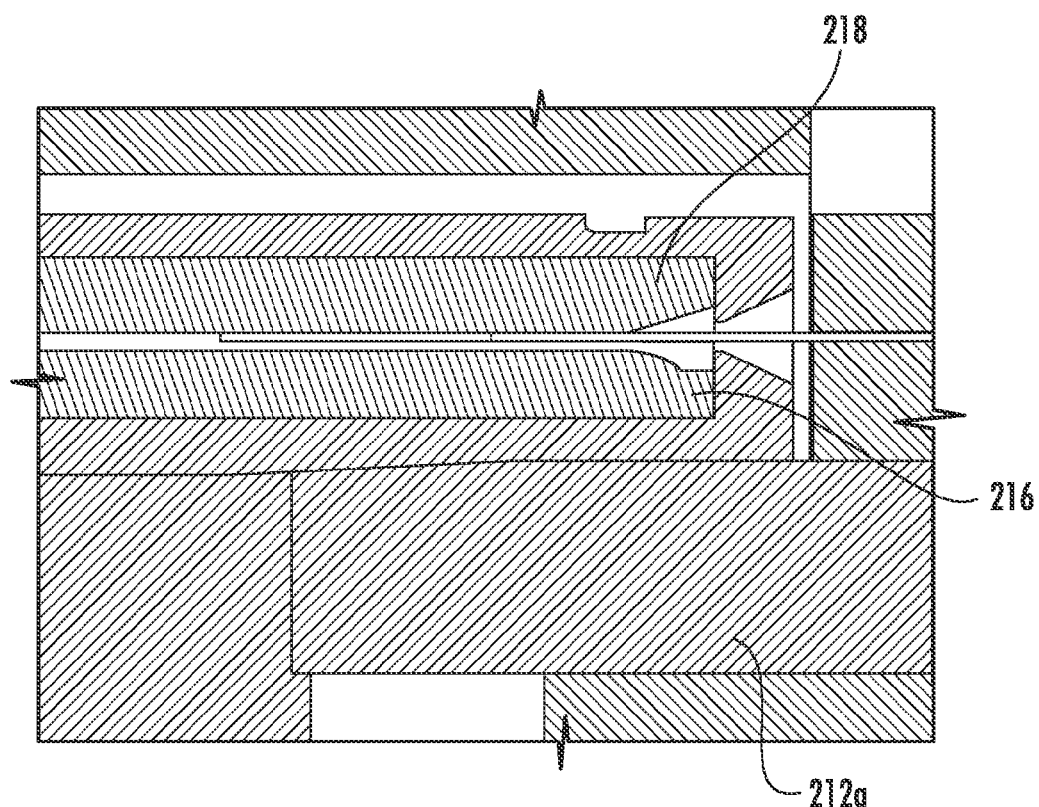
Figure 23:
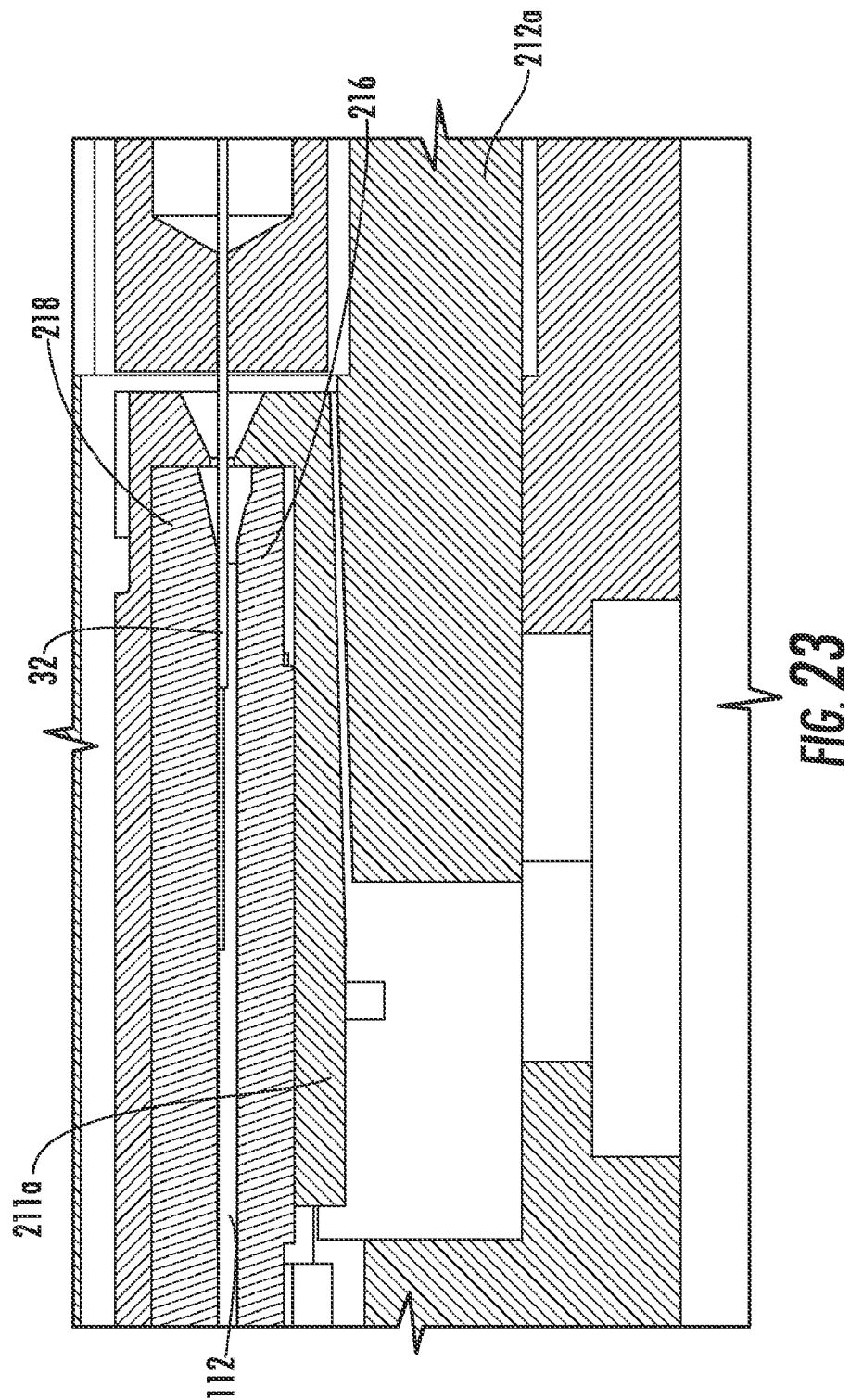
Figure 24:
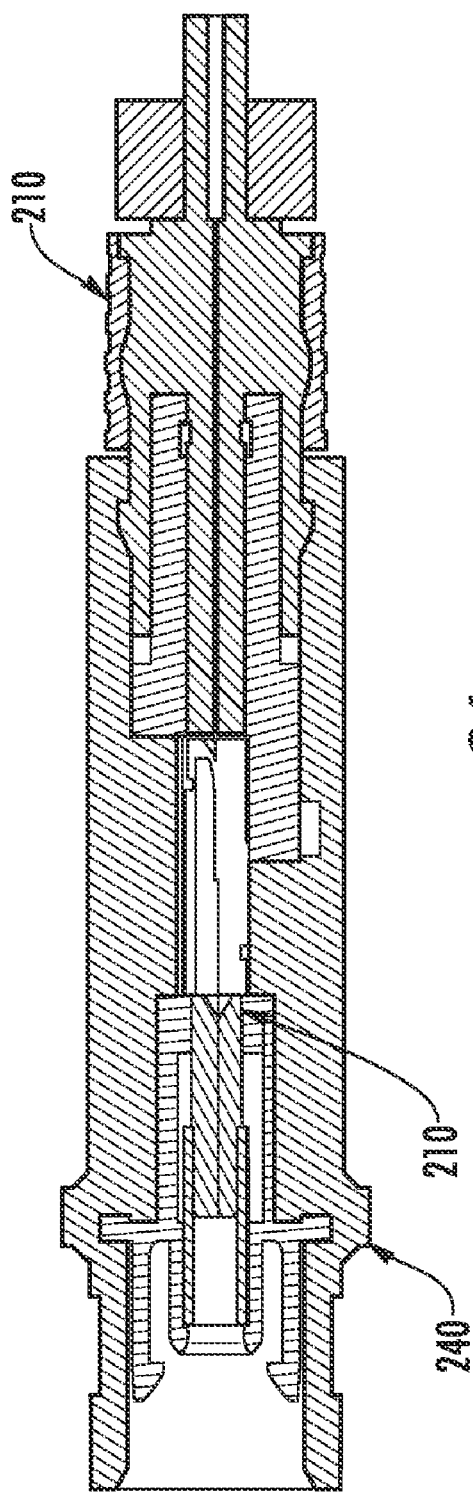
Figure 25:
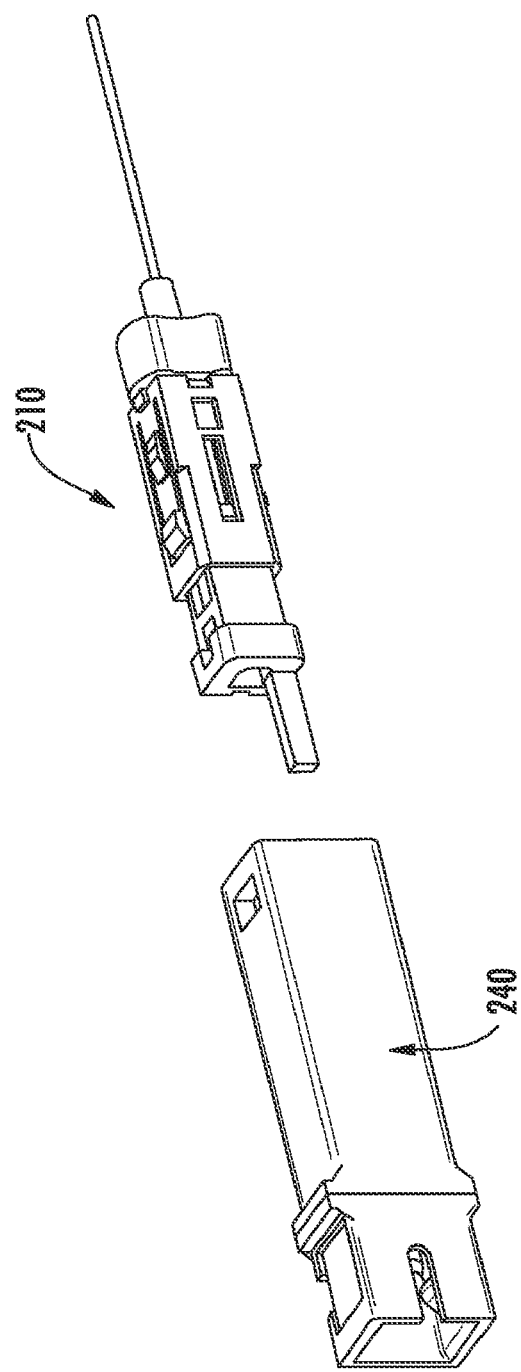
Figure 28:
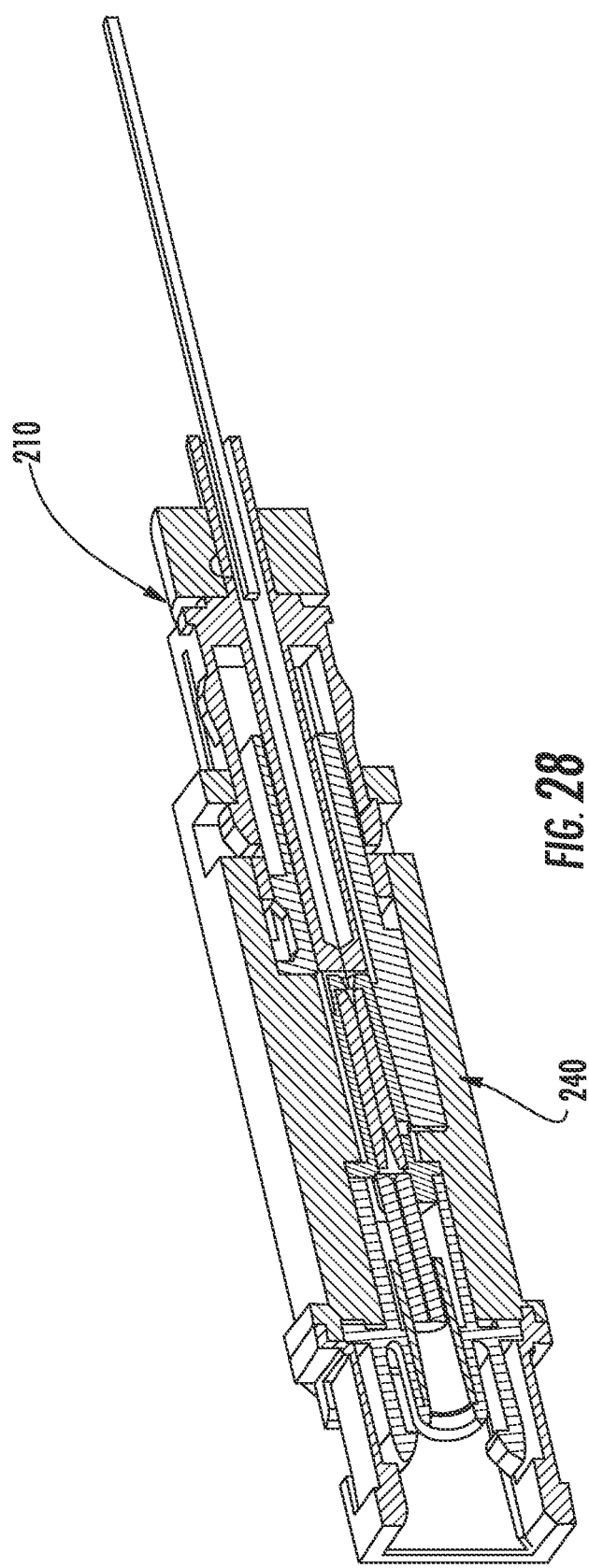
Figure 29:
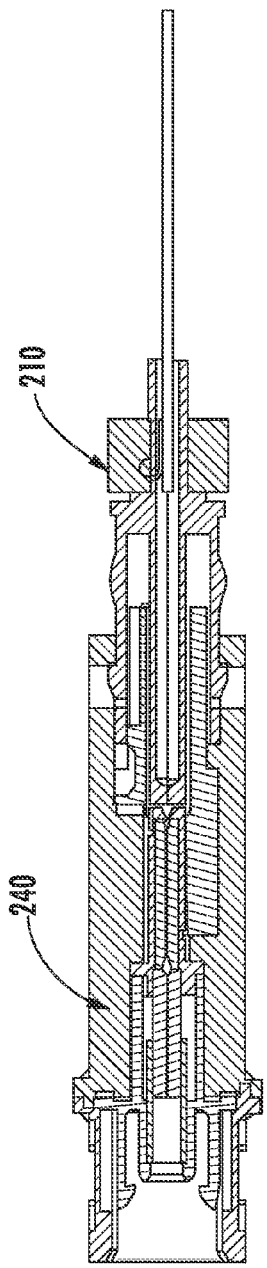
Figure 30:
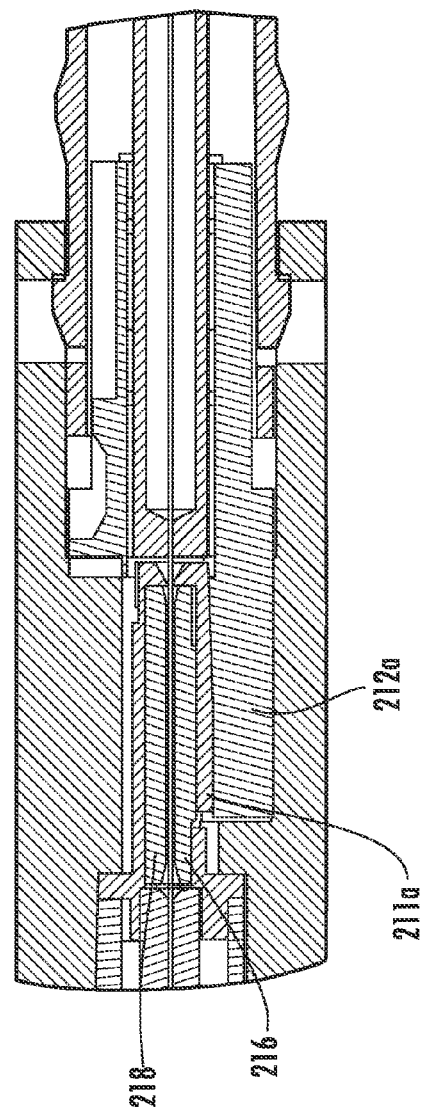

By way of example, FIGS. 20-24 depict a concept for the splice activation that is both releasable and reversible. Specifically, FIGS. 20-24 depict a mechanical activation for termination that has a wedge activation for making the optical connection between the optical fiber held by the handler and the optical fiber stub of the termination assembly. More specifically, FIGS. 20 and 21 respectively show a termination assembly 210 and a shroud 212 having respective wedge surfaces that interact for a splice activation as shown in FIG. 22. Termination assembly 210 is similar to termination assembly 110, but has a different type of mechanical actuation. Termination assembly 210 includes a holder 211 having a wedge portion 211a configured as a cantilever arm that deflects to push splice parts (not visible) inside the holder 211 together. Wedge portion 211a interacts with a wedge portion 212a disposed on a fiber support or shroud 212. Wedge portion 212a is a protrusion that extends from the front of shroud 212. Simply stated wedge portion 212a interacts/pushes wedge portion 211a (i.e., the wedge of the holder deflects the cantilever arm of the holder) upward pushing the splice parts together, thereby forming the mechanical splice by securing the optical fiber stub and optical fiber in position. FIG. 23 depicts an enlarged detail view of the interaction between wedge portion 211a and wedge portion 212a for pushing splice parts 216 and 218 together. Like before, splice parts 216 and 218 form the mechanical splice by clamping optical fiber stub 112 and optical fiber 32 therebetween. FIG. 24 shows having termination assembly 210 forming a portion of a connector-to-handler adapter 240 having a handler 210 attached thereto. FIGS. 25 and 26 respectively depict perspective views of connector-to-handler adapter 240 and handler 210 before mating and handler 210 having shroud 212 retracted exposing optical fiber 32 as during mating. FIGS. 27-30 show various other sectional views. This splice activation that is both releasable and reversible since when handler 210 is disengaged the interaction between the wedges is released and can be remade when the handler 210 is re-inserted. Of course, other wedge activations are possible, for instance, a wedge portion for splice activation can be disposed on a splice part. Other variations can use a single wedge surface for splice activation.

Figure 31:
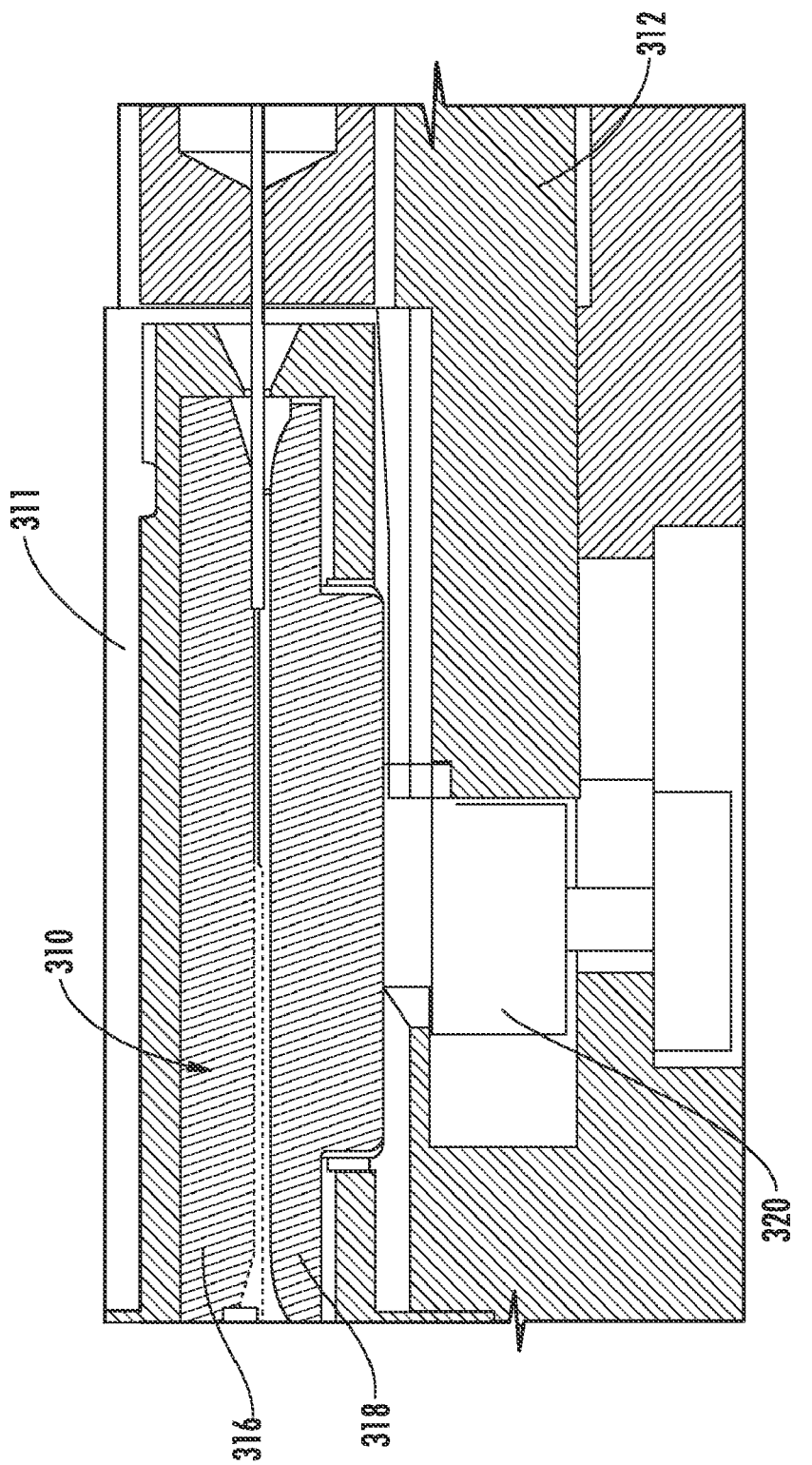
Figure 32:
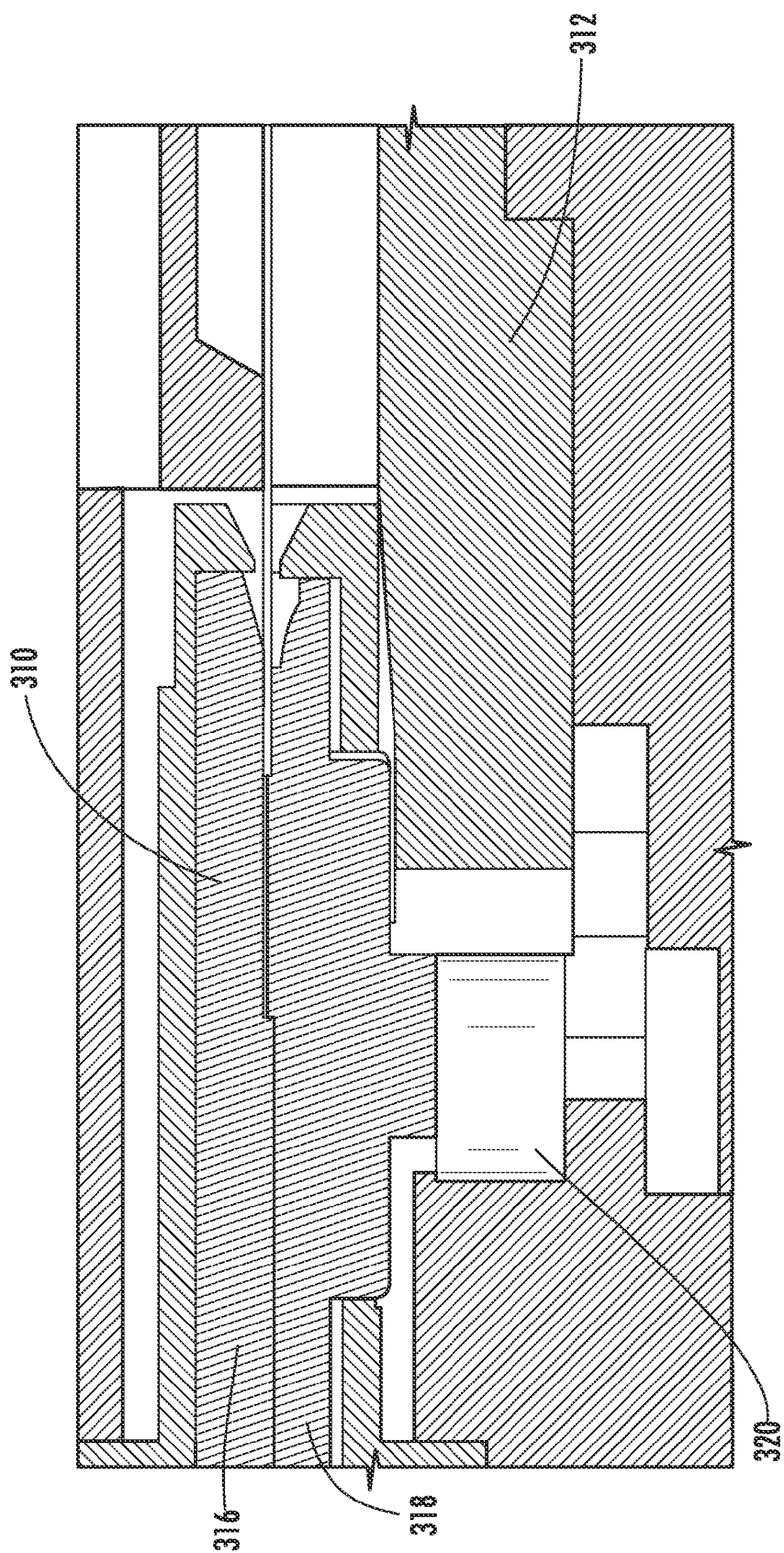
Figure 34:
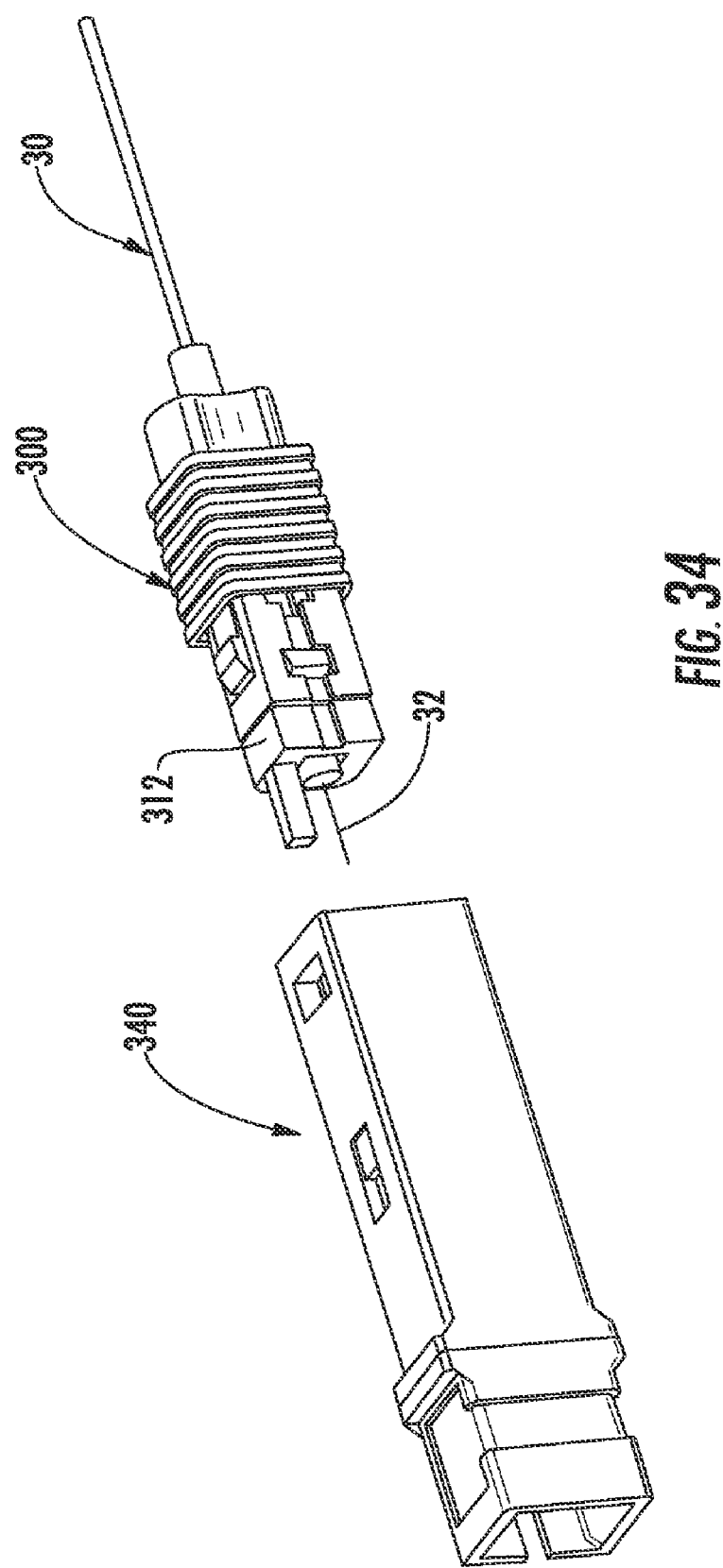
Figure 35:
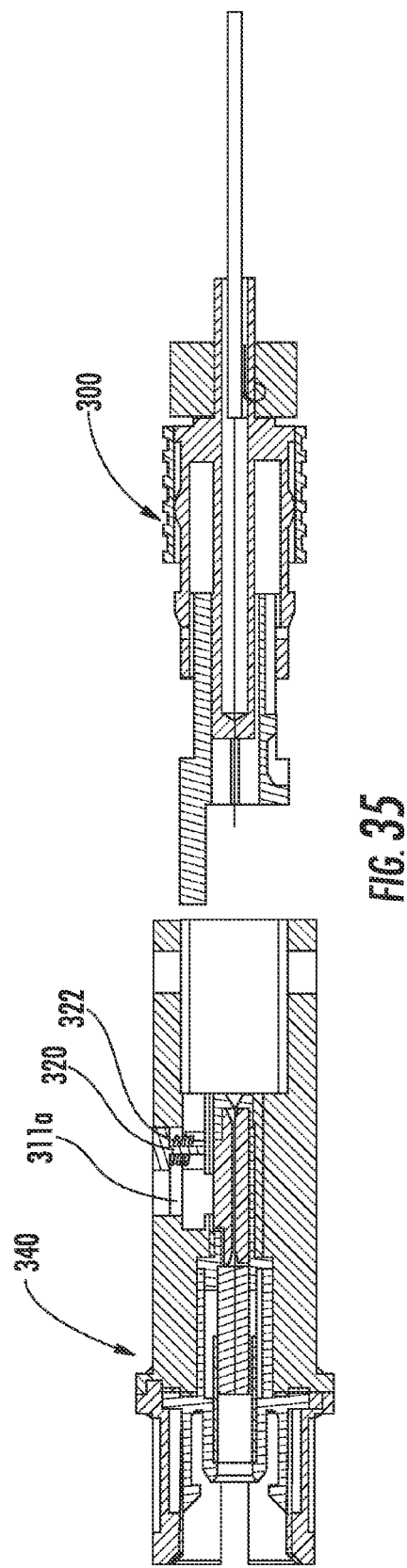
Figure 36:
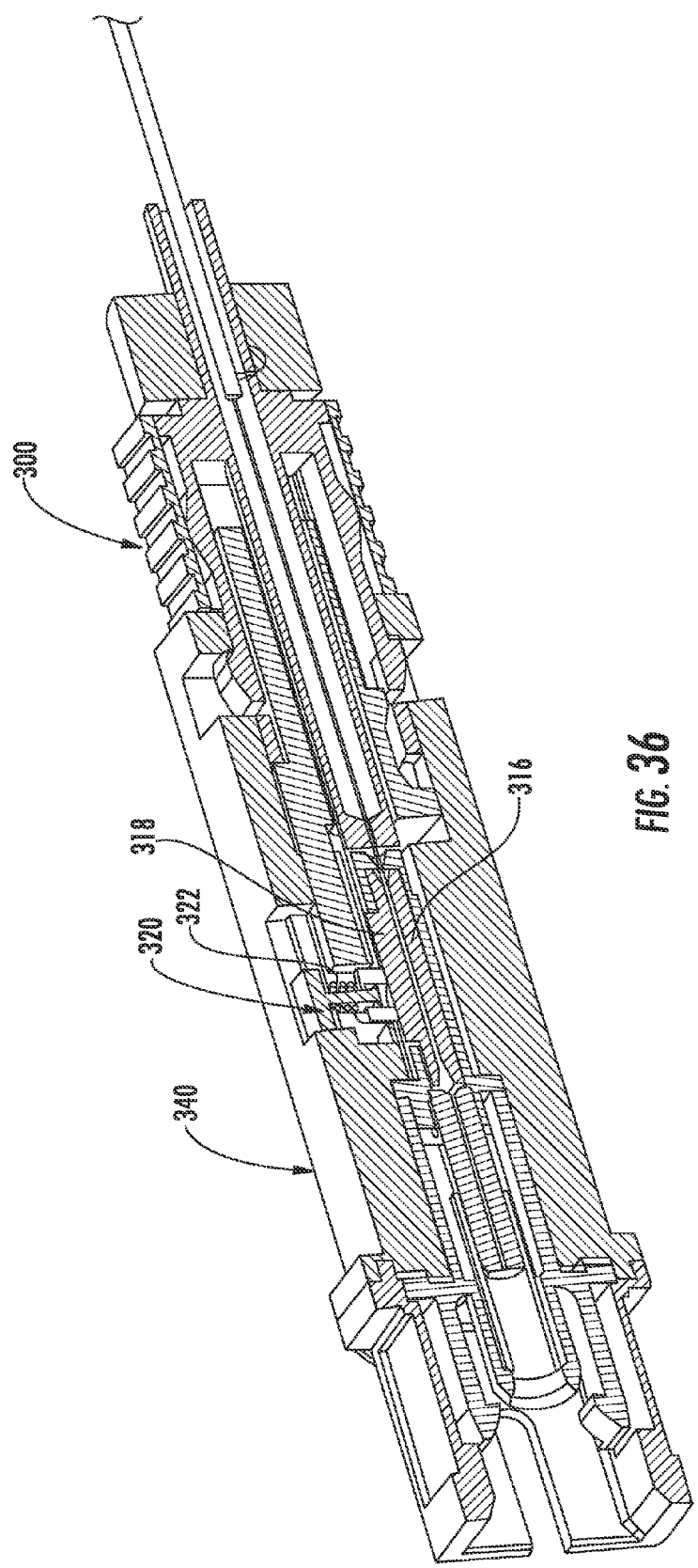
Figure 37:
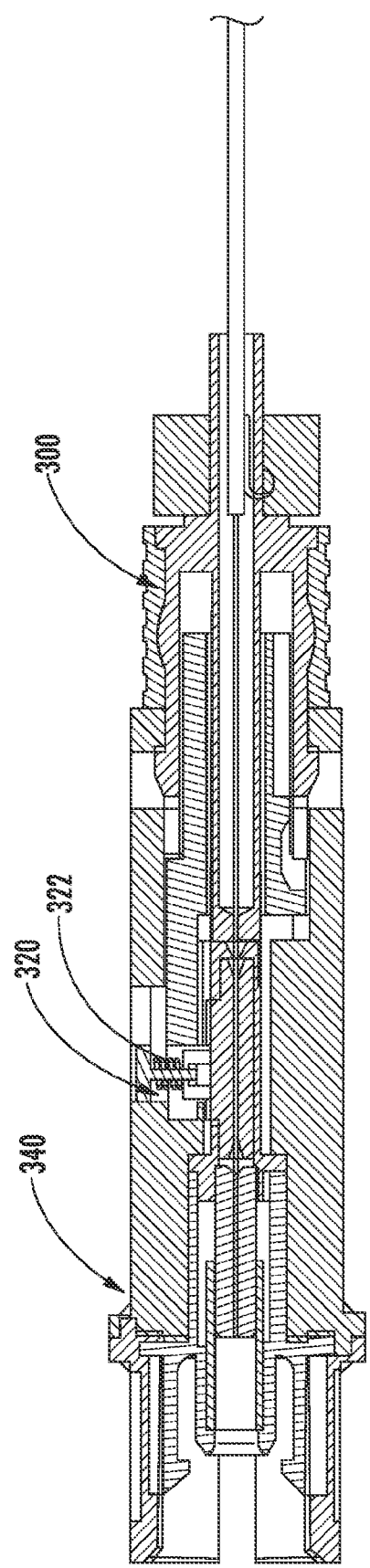

FIGS. 31-37 depict another concept for the splice activation that is not releasable or reversible. However, the concept shown in these figures could be releasable and reversible if it further included a release mechanism. Specifically, FIGS. 31-37 depict a mechanical activation for a termination assembly that uses a spring activation for securing the mechanical splice between the optical fiber of the handler and the optical fiber stub of termination assembly. FIGS. 31 and 32 respectively show portions of a termination assembly 310 and a fiber support or shroud 312 that that interact for splice activation as shown in FIG. 31. Termination assembly 310 is similar to termination assembly 110, but has a mechanical actuation that is spring loaded. Specifically, termination assembly 310 includes a holder 311 having an opening 311a so that splice activation 320 passes through opening 311a and pushes splice parts 316,318 together once aligned with the opening. In other words, a protrusion on the front of shroud 312 pushes splice activation 320 to the left as the handler is inserted until it aligns with opening 311a so that the splice activation 320 moves to the splice parts. In this embodiment, splice activation 320 is biased toward the splice parts using a resilient member 322 such as a compression spring. Examples of other of resilient members and/or configurations include, but are not limited to, leaf springs, Belleville washer, integrate with the button, etc. FIGS. 33 and 34 respectively depict perspective views of connector-to-handler adapter 340 and handler 300 before mating and handler 300 having shroud 312 retracted exposing optical fiber 32 as during mating. FIGS. 35-37 show various other sectional views showing the operation of the splice activation 320.

Figure 39:
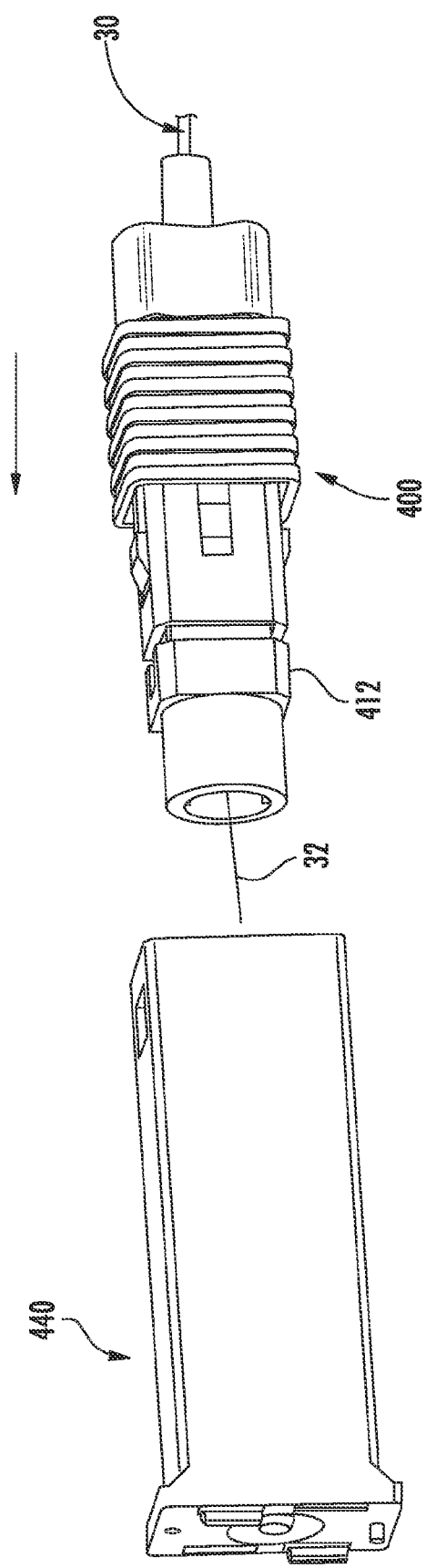
FIG. 39 is a perspective view of a handler and connector-to-handler adapter of FIG. 1 shown with the sheath of the handler being in the retracted position, thereby exposing the optical fiber.
Figure 40:
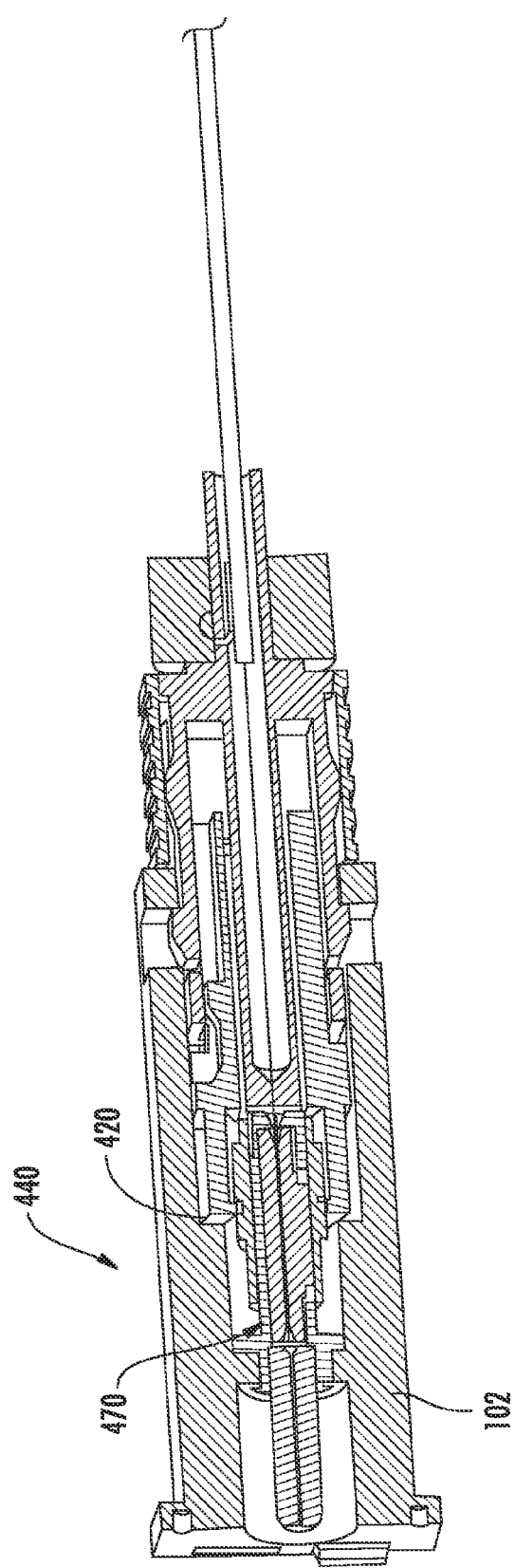
FIG. 40 is a cross-sectional view of the handler and connector-to-handler adapter of FIG. 1 mated together for termination.
Figure 41:
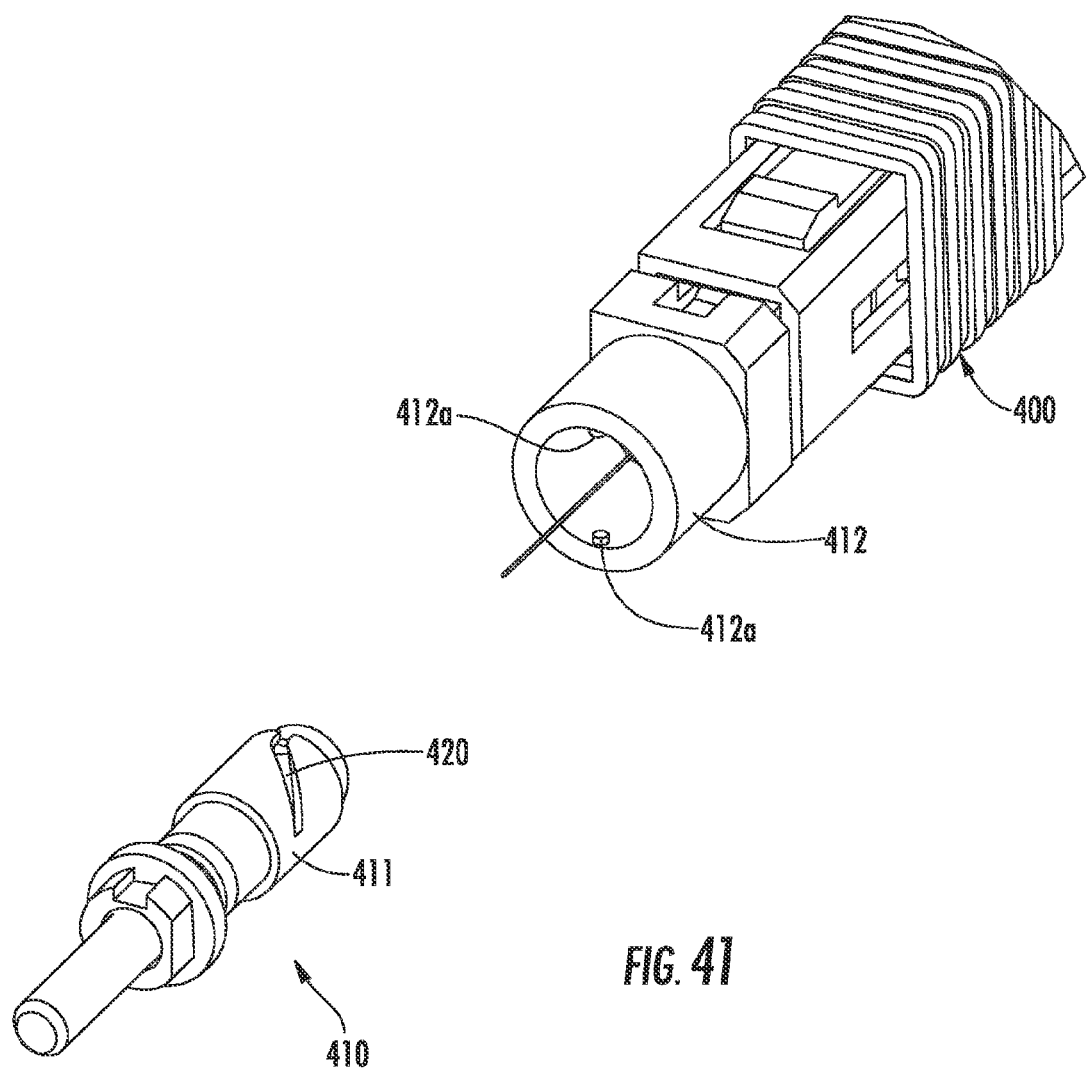
FIG. 41 depicts a perspective view of the handler and the termination assembly of the connector-to-handler adapter.
Figure 42:
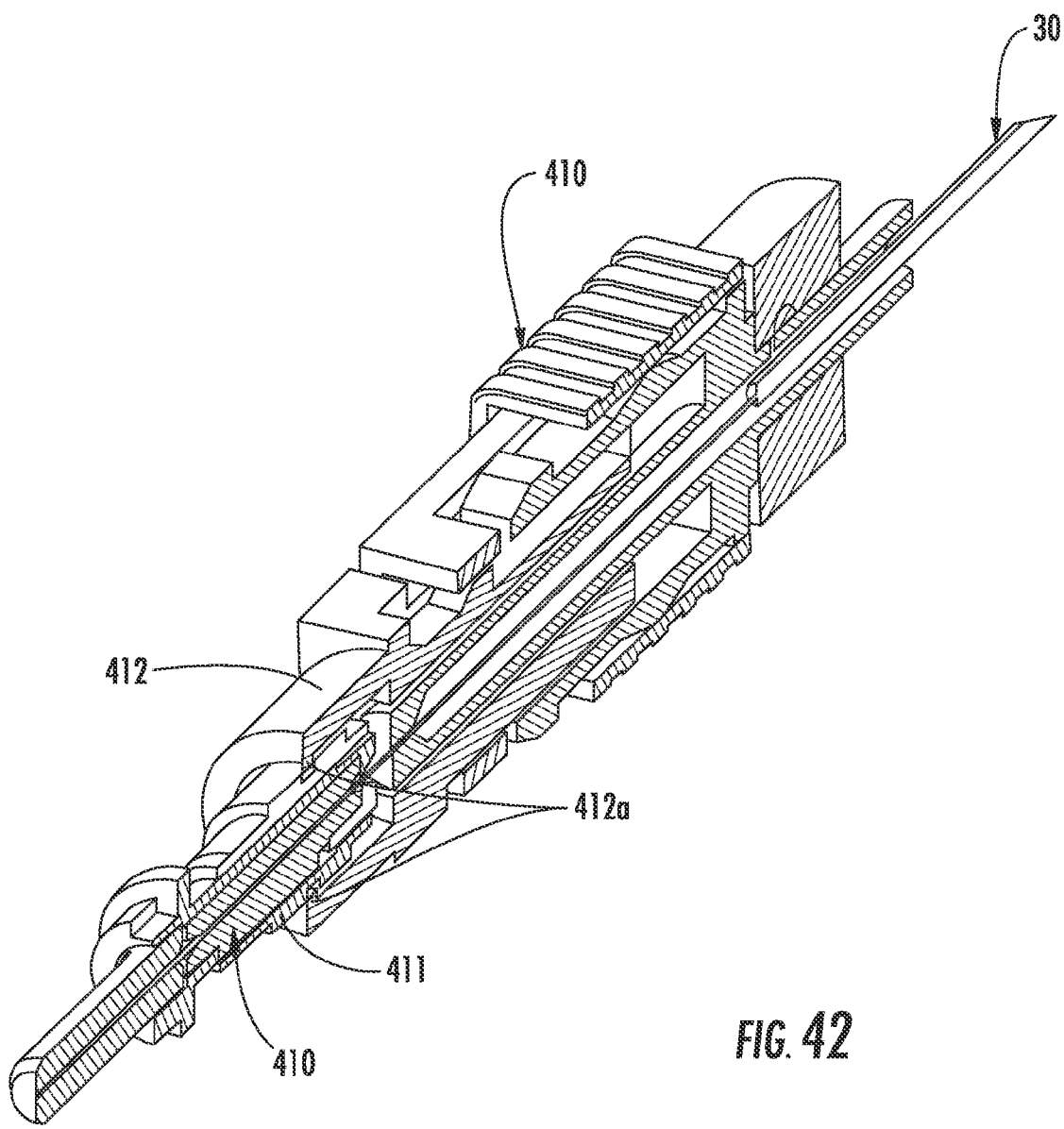
FIG. 42 depicts a longitudinal cross-sectional view of the cam interaction between the handler and the connector-to-handler adapter when mated.
Figure 43:
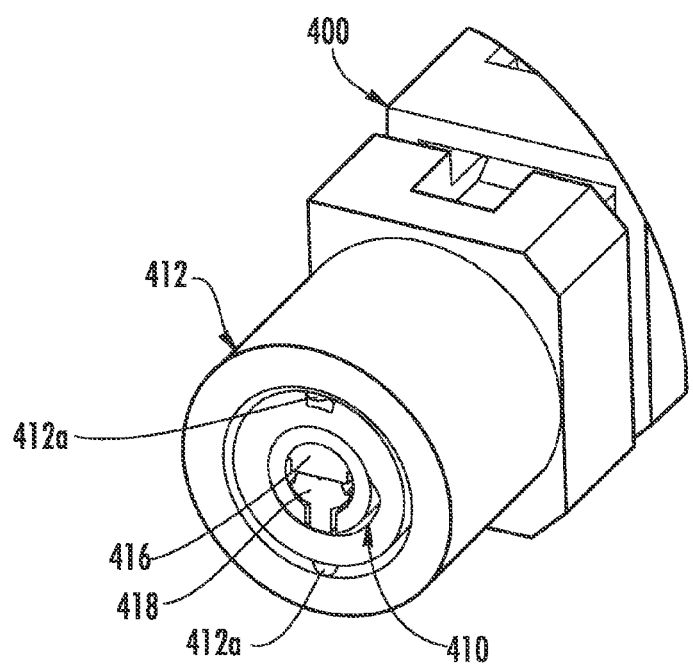
FIG. 43 depicts a traverse cross-sectional view of the cam interaction between the handler and the connector-to-handler adapter for making the mechanical termination.

FIGS. 38-43 depict another mechanical activation for a termination assembly that uses a cam activation for securing the mechanical splice between the optical fiber of the handler and the optical fiber stub of termination assembly. FIG. 38 and FIG. 39 respective perspective views of a handler 400 and connector-to-handler adapter 440 respectively showing a fiber support or shroud 412 of the handler 400 being in the extended position and the sheath of the handler in the retracted position, thereby exposing optical fiber 32. Termination assembly 410 is similar to termination assembly 110, but has a mechanical actuation that is cam activated. FIGS. 40-42 depict various views of termination assembly 410 which includes a cam 411 having one or more grooves (not numbered) so that splice activation 420 rotates when engaged with a pair of bosses 412a on shroud 412, thereby pushing splice parts 416,418 together. In other words, bosses 412a on the front of shroud 412 align and engage the grooves on cam 411 and rotates the same as the handler 400 moving the splice parts together. Moreover, disengaging and removing the handler 400 from the connector-to-handler adapter 440 releases the splice activation, which is reversible if the handler 400 is re-inserted. FIG. 43 depicts a traverse cross-sectional view of the cam interaction between the bosses 412a and termination assembly 410.

Figure 44:
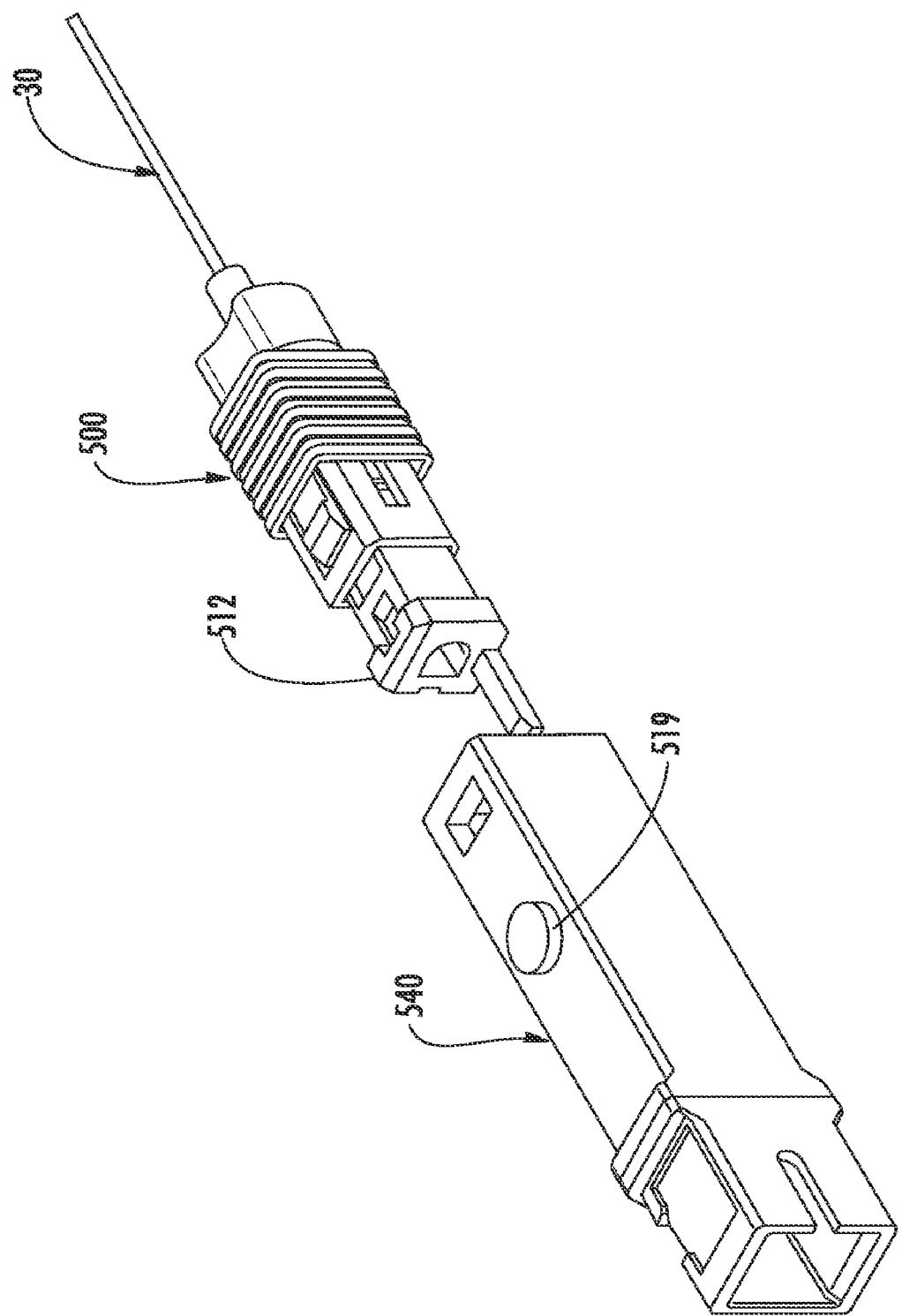

FIGS. 44-48 depict the concepts of another mechanical actuation for making the optical connection between the optical fiber of the handler and the optical fiber stub of the connector-to-handler adapter. FIG. 44 is a perspective view of a handler 500 and connector-to-handler adapter 540 having a releasable and reversible splice activation. Termination assembly 510 is similar to termination assembly 210 with a mechanical actuation that is wedge activated, but releasable using a release button 519. FIGS. 45-48 depict various sectional views of the handler 500 attached to the connector-to-handler adapter 540. Specifically, FIGS. 45 and 46 depict the handler 500 inserted and attached to the connector-to-handler adapter 540, thereby pushing release button 519 upward to an engage position. In other words, a wedge portion (not numbered) of shroud 512 pushes release button to an engage position along with pushing the splice parts together. However, in this embodiment release button 519 may be pushed downward to release (i.e., disengage) the splice activation by using the wedge shaped surface to push shroud 512 rearward. By way of example, FIGS. 47 and 48 depict release button 519 pushed downward and pushing shroud 512 rearward to release the splice activation. Thus, handler 500 may be removed and reconfigured with a different connector-to-handler adapter or re-terminated with the same connector-to-handler adapter.

Figure 50:
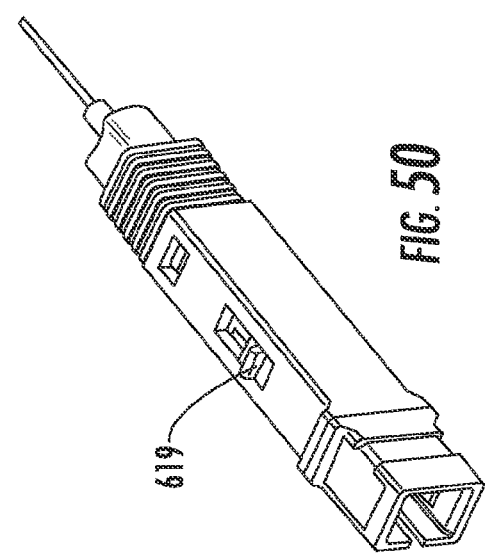
Figure 51:
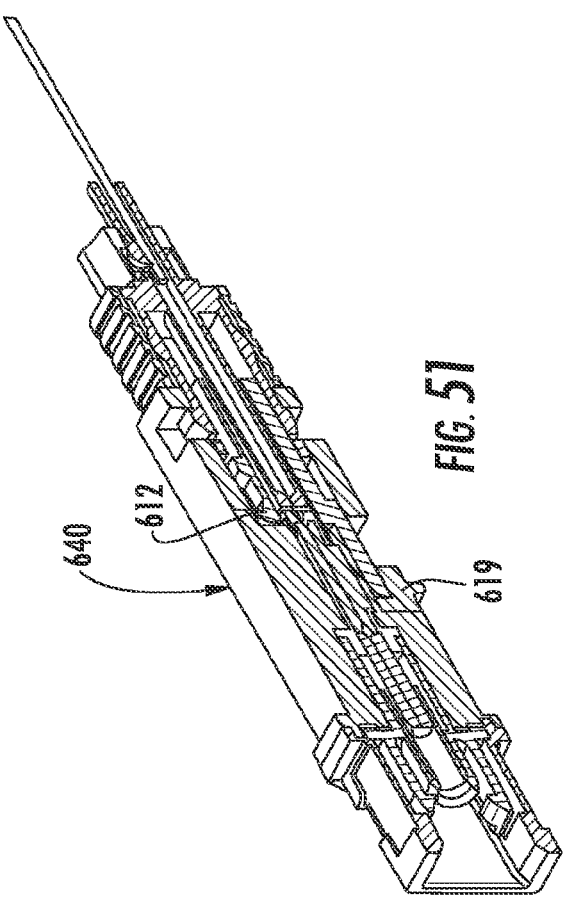
Figure 52:
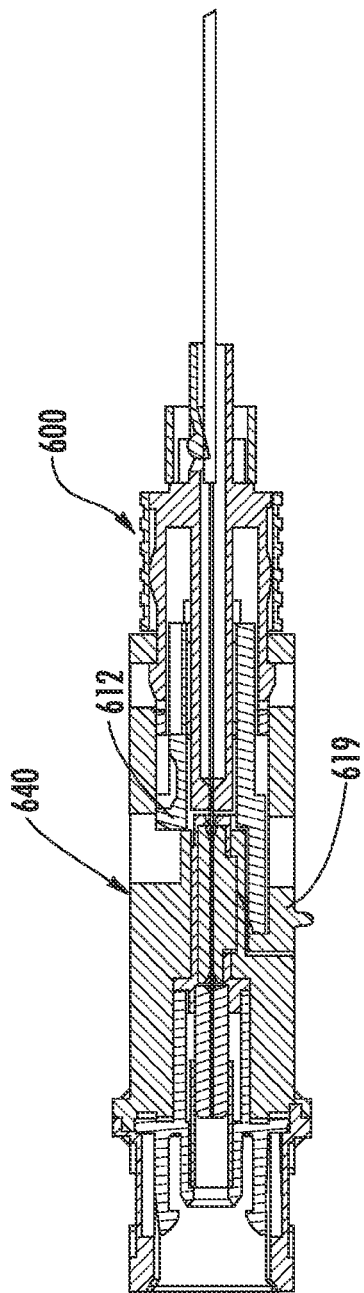

FIGS. 49-55 depict the concepts of another mechanical actuation for making the optical connection between the optical fiber of the handler and the optical fiber stub of the connector-to-handler adapter. FIG. 49 is a perspective view of a handler 600 and connector-to-handler adapter 640 having a releasable and reversible splice activation. Termination assembly 610 is similar to termination assembly 210 with a mechanical actuation that is wedge activated, but releasable using a release button 619 that slides in the longitudinal direction. As best shown in FIGS. 50 and 53, release button 619 can be slid between an engaged position and a disengaged position. FIGS. 50-52 depict various views of the handler 600 attached to the connector-to-handler adapter 640. Specifically, FIGS. 50-52 depict the handler 600 inserted and attached to the connector-to-handler adapter 640, thereby pushing release button 619 forward to an engage position. In other words, shroud 612 pushes release button to an engage position along with pushing the splice parts together. However, in this embodiment release button 619 may be pushed rearward to release (i.e., disengage) the splice activation by pushing shroud 612 rearward. By way of example, FIGS. 53-55 depict release button 619 being pushed rearward and pushing shroud 612 rearward to release the splice activation. Thus, handler 600 may be removed and reconfigured with a different connector-to-handler adapter or re-terminated with the same connector-to-handler adapter.

Figure 56:
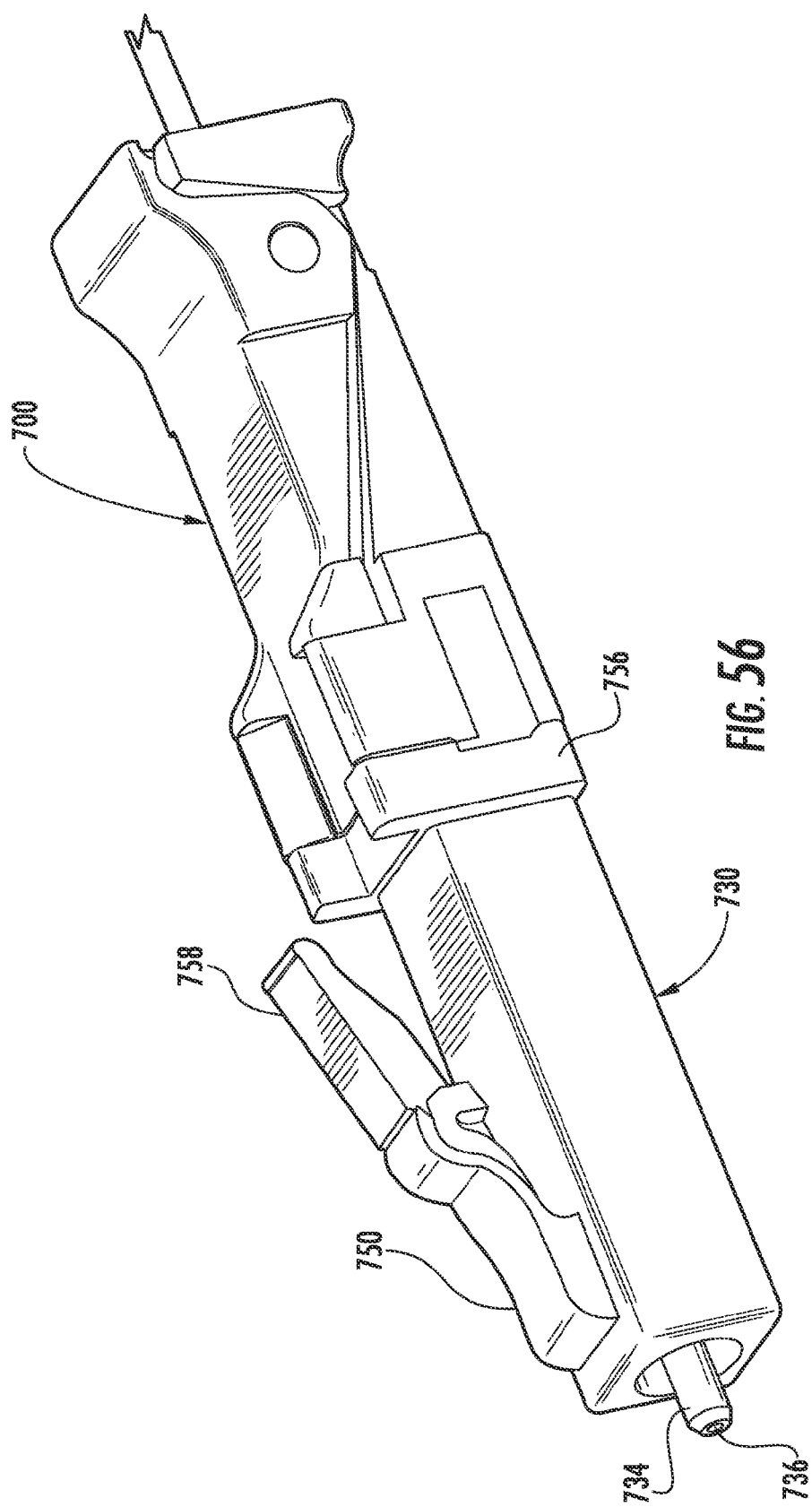
FIG. 56 is a perspective view of an optical fiber connector having an optical fiber handler attached thereto and forming a portion of the fiber optic connector.

In still other embodiments, the handler could attach to a fiber optic connector; instead of having an adapter integrated with the connector. FIG. 56 shows a completed termination where a handler 700 is attached to a fiber optic connector 730 to form a portion of the same. Handler 700 is attached to a portion of the fiber optic connector 730 (i.e., the back end) such as with a snap-fit or the like. Thereafter, the craft can plug fiber optic connector 730 into an adapter or the like as desired.

Fiber optic connector 730 includes an optical fiber ferrule 734 having a stub optical fiber 736 for mechanical splicing with the optical fiber secured in handler 700. Further, fiber optic connector 730 includes a ferrule holder (not visible) having at least one splice part therein for securing the mechanical splice between the optical fibers. Handler 700 guides the prepared optical fiber into the connector and inhibits damage since it is cleaved to a suitable length by cooperating with a stripper or other suitable manner. Handler 700 guides the prepared optical fiber into the connector and inhibits damage since it is cleaved to the proper length. Thereafter, suitable structure is activated to activate the internal mechanical splice between the optical fiber held by handler 700 and a stub optical fiber (not visible) of the fiber optic connector 730. Thereafter, the fiber optic connector can be tested for continuity using a suitable test tool.

In the embodiment shown in FIG. 56, handler 700 attaches to an outer portion of fiber optic connector 730, but other embodiments may attach to other portions/components of the fiber optic connector. More specifically, handler 700 attaches to a portion of the splice housing 756 so that when that a portion of splice housing 756 is rotated relative to the outer housing it activates one or more splice parts within the splice housing from an open position to a closed position, thereby securing the mechanical splice between the optical fibers.

With any of the embodiments, the optical fiber extending from the front end of the handler may have a length that is slightly longer than the length from the stub optical fiber to the front end of handler or other reference surface such as the latching boss (i.e., the extending length of optical fiber is longer than the length from the latching boss to the rear end face of the stub optical fiber), thereby inducing a bend in the optical fiber when inserted into the fiber optic connector to ensure physical contact between the stub optical fiber and the optical fiber secured by the handler. In other words, the bend in the optical fiber creates a spring force to push the optical fiber secured in the handler toward the stub optical fiber. Further, the optical fiber handler 700 may be released from the fiber optic connector 730 by the craft to re-position and/or re-secure the optical fiber if necessary. Simply stated, the splice activation mechanism can be reversed to release the clamping force of splice parts on the optical fibers. Then the handler can be removed from the fiber optic connector and the handler opened to released the optical fiber from the handler for repositioning and preparing for another try at preparation and termination. However, other embodiments can be more permanent with a one-shot termination type of design if desired.

Further, the activation mechanism may include a deactivation and/or reactivation feature for allowing the release of the splice parts if the mechanical splice does meet the desired performance level. In other words, the craft can undo the splice by releasing the bias on the splice parts and reposition and/or re-cleave the optical fiber and then reposition/re-insert the optical fiber to make a suitable mechanical splice connection. By way of example, the outer housing may be rotated relative to the splice housing in one direction to bias the splice parts together and rotation of the outer housing in the other direction releases the bias on the splice parts.

FIGS. 57 and 58 respectively depict a perspective and end view of handler 700 depicted in the open position. Handler 700 includes a first portion 712 and a second portion 714 that are attached together. The second portion 714 can pivot relative to the first portion 712 (or vice versa) and the handler 700 defines a passageway (not numbered) extending therethrough from a first end 711 to a second end 713 for receiving one or more optical fibers therein. In this embodiment, the pivot axis between first portion 712 and second portion 714 is generally perpendicular to a passageway for the optical fiber.

Handler 700 can be configured to secure the at least one optical fiber thereto by pivoting the first portion 712 relative to the second portion 714 for clamping onto the optical fiber, buffer layer, etc. FIG. 58 shows an end view of handler 700 depicting the passageway defining a clamping portion (not numbered) formed between first portion 712 and second portion 714 for securing multiple sized fiber or buffered fibers (i.e., a bare optical fiber, coated optical fiber, or an upcoated/buffered optical fiber). Specifically, handler 700 has a pivot point 716 adjacent to one end and a latching portion 718 adjacent to the other end for securing the first portion 712 to the second portion 714. Pivot point 716 is adjacent to a rear end and latching portion 718 is adjacent to a front end of handler 700; however, this arrangement could be reversed in other embodiments. Hander 700 uses resilient fingers (not numbered) on second portion 714 for securing the first portion 712 with second portion 714 in the closed position. Further, a part of the first portion 712 fits within a part of the second portion 714 when the handler 700 is the open and/or closed position, thereby creating a relatively compact design. As shown, fiber handler 700 also includes a fiber support (not numbered) that is biased to the outward position using a resilient member or spring.

Handler 700 is configured for attaching to fiber optic connector 730 in a releasable manner using a second latching feature. Shown adjacent the second end 713, handler 700 includes second latching feature (not numbered) such as one or more recesses below latching portion 718. The second latching feature of handler 700 cooperates with latching structure on fiber optic connector 730 such as resilient latching fingers on splice housing 756. Simply stated, when handler 700 is fully seated relative to fiber optic connector 730 the latching structure on fiber optic connector 730 snap-fits with the latching feature on handler 700. Moreover, the latching feature also acts as a keying feature for handler 700. As the handler is inserted and secured to the fiber optic connector 730 the optical fiber secured by the handler 700 is inserted past the lead-in and positioned at the splice part(s) and abutted with stub optical fiber 736. Moreover, the optical fiber has a bend therein for maintaining physical contact with the stub optical fiber 736 since it is slightly longer than the distance within the fiber optic connector. Then, the craft can secure the mechanical splice by rotating the activation feature, thereby clamping the optical fibers therein and completing the mechanical termination process.

Activation feature 756 uses a suitable movement such as rotational movement relative to the splice housing for biasing one or more splice parts. More specifically, the activation feature 756 includes a cam surface (i.e., an eccentric surface) for biasing the one or more splice parts, thereby securing the abutment of the stub optical fiber 736 with the optical fiber secured in the handler.

Simply stated, the activation feature 756, in this case, the cam surface pushes on the keel of one or more splice parts that extends through the window of splice housing as it is rotated, thereby biasing the splice parts together and securing the abutment of the optical fibers. In this embodiment, outer housing 750 is configured with an LC connector footprint and includes a latch 758 molded along with latch ears (not numbered) on either side thereof for securing the same in an LC adapter. Of course, the concepts disclosed may be used with other fiber optic connector footprints.

As known in the art, one or more of the components or portions of the components of the fiber optic connector (i.e., the splice housing and/or splice component(s)) or the like may be translucent so the craft and/or a tool can view the glow of the mechanical splice for evaluating the continuity of the mechanical splice as known. For instance, U.S. Pat. No. 6,816,661 discloses methods for evaluating the continuity of the mechanical splice. Moreover, the housing or other component may have one or more view ports for viewing the glow of the mechanical splice to evaluate the continuity of the mechanical splice.

Although preferred embodiments and specific examples were illustrated and described herein, it will be readily apparent to those of ordinary skill in the art that other embodiments and examples can perform similar functions and/or achieve like results. All such equivalent embodiments and examples are within the spirit and scope of the present disclosure and are intended to be covered by the appended claims. It will also be apparent to those skilled in the art that various modifications and variations can be made to the embodiments shown. Thus, it is intended that the disclosure and/or claims cover the modifications and variations.

We claim:

1. An optical fiber handler system for making a mechanical termination comprising:
   a handler comprising a handler body having a passageway extending therethrough defining a front end opening and a rear end opening on opposite ends of the handler body, and a cam located at the rear end opening of the handler body, the cam having a non-circular bore such that, in a closed position, the cam deflects a gripping lever located in the bore toward an optical fiber cable for engagement therewith and, in an open position, the cam releases the gripping lever to allow movement of the gripping lever within the bore away from the optical fiber cable;

wherein the handler cooperates with at least one fiber preparation tool for preparing the optical fiber cable for termination.

2. The handler system of claim 1, wherein the handler body can secure a bare optical fiber or a buffered optical fiber.

3. The handler system of claim 1, wherein the handler comprises a shroud being movable along a longitudinal direction of the handler body.

4. The handler system of claim 3, wherein the shroud has at least one boss or at least one protrusion.

5. The handler system of claim 1, further comprising a cleaver being the at least one fiber preparation tool for cutting an optical fiber, the cleaver having an interface for aligning and positioning the handler body therewith for cutting the optical fiber secured by the handler to a predetermined length.

6. The handler system of claim 5, wherein the cleaver also strips the optical fiber cable.

7. The handler system of claim 1, further comprising a stripper being the at least one fiber preparation tool for removing one or more coatings from an optical fiber, the stripper configured for interfacing with the handler.

8. The handler system of claim 1, wherein the gripping lever is cantilevered to the handler body.

9. The handler system of claim 1, wherein the cam is rotated relative to the handler body between the closed and open positions.

* * * * *